United States Patent
Joao

(10) Patent No.: US 7,280,978 B1
(45) Date of Patent: Oct. 9, 2007

(54) APPARATUS AND METHOD FOR PROVIDING AND/OR FOR FULFILLING SUBSCRIPTION SERVICES

(76) Inventor: Raymond Anthony Joao, 122 Bellevue Pl., Yonkers, NY (US) 10703

( * ) Notice: Subject to any disclaimer, the term of this patent is extended or adjusted under 35 U.S.C. 154(b) by 1098 days.

(21) Appl. No.: 09/659,264

(22) Filed: Sep. 11, 2000

Related U.S. Application Data

(60) Provisional application No. 60/154,740, filed on Sep. 17, 1999.

(51) Int. Cl.
*G06F 17/60* (2006.01)
(52) U.S. Cl. .............................. 705/16; 705/1; 705/10; 705/14
(58) Field of Classification Search ................. 705/16, 705/26, 27, 1, 14; 700/216
See application file for complete search history.

(56) References Cited

U.S. PATENT DOCUMENTS

| | | | |
|---|---|---|---|
| 4,890,321 A | | 12/1989 | Seth-Smith et al. |
| 5,168,445 A | * | 12/1992 | Kawashima et al. ......... 705/10 |
| 5,477,262 A | | 12/1995 | Banker et al. |
| 5,483,445 A | * | 1/1996 | Pickering ..................... 705/40 |
| 5,557,541 A | | 9/1996 | Schulhof et al. |
| 5,572,442 A | | 11/1996 | Schulhof et al. |
| 5,590,197 A | * | 12/1996 | Chen et al. ................... 705/65 |
| 5,703,951 A | * | 12/1997 | Dolphin ........................ 705/51 |
| 5,708,960 A | * | 1/1998 | Kamisaka et al. ............ 725/31 |
| 5,769,269 A | * | 6/1998 | Peters ........................... 221/7 |
| 5,850,520 A | * | 12/1998 | Griebenow et al. ......... 709/206 |
| 5,875,435 A | * | 2/1999 | Brown ......................... 705/30 |
| 5,892,909 A | * | 4/1999 | Grasso et al. ............... 709/201 |
| 5,907,845 A | * | 5/1999 | Cox et al. ................... 707/102 |
| 5,926,796 A | * | 7/1999 | Walker et al. ................ 705/16 |
| 5,930,761 A | * | 7/1999 | O'Toole ........................ 705/5 |
| 5,970,470 A | * | 10/1999 | Walker et al. ................ 705/14 |
| 5,995,092 A | | 11/1999 | Yuen et al. |

(Continued)

FOREIGN PATENT DOCUMENTS

FR 2 757 656 * 6/1998

(Continued)

OTHER PUBLICATIONS

"Peoples steps up marketing efforts", Chain Drug Review, v 22, n 8, p. 247+, May 1, 2000.*

(Continued)

Primary Examiner—Kambiz Abdi
Assistant Examiner—John Winter
(74) Attorney, Agent, or Firm—Raymond A. Joao, Esq.

(57) ABSTRACT

A computer-implemented method, including receiving a request to receive or pick-up a printed issue of at least one of a periodical, a newspaper, and a magazine, at a retail facility or a store pursuant to a subscription, processing information regarding the request with a processing device, wherein the processing device determines whether the subscription is active or not active or determines whether any issue or any issues of the at least one of a periodical, a newspaper, and a magazine, remain to be fulfilled pursuant to the subscription, and transmitting a message in response to the request, wherein the message contains an authorization or a denial of the request, and further wherein the message is transmitted to a point-of-sale transaction device located at the retail facility or the store.

45 Claims, 10 Drawing Sheets

U.S. PATENT DOCUMENTS

| | | | |
|---|---|---|---|
| 6,014,641 | A | 1/2000 | Loeb et al. |
| 6,115,690 | A * | 9/2000 | Wong .............................. 705/7 |
| 6,249,772 | B1 * | 6/2001 | Walker et al. ................. 705/26 |
| 6,318,536 | B1 * | 11/2001 | Korman et al. ............. 194/217 |
| 6,332,124 | B1 * | 12/2001 | Loeb et al. ..................... 705/1 |
| 6,334,112 | B1 * | 12/2001 | Walker et al. ................. 705/23 |
| 6,334,113 | B1 * | 12/2001 | Walker et al. ................. 705/23 |
| 6,334,118 | B1 * | 12/2001 | Benson ........................ 705/52 |
| 6,351,773 | B1 | 2/2002 | Fijolek et al. |
| 6,415,262 | B1 * | 7/2002 | Walker et al. ................. 705/14 |
| 6,438,588 | B1 * | 8/2002 | Crandall ...................... 709/217 |
| 6,439,345 | B1 * | 8/2002 | Recktenwald et al. ........ 186/55 |
| 6,470,322 | B1 * | 10/2002 | Walker et al. ................. 705/16 |
| 6,473,740 | B2 * | 10/2002 | Cockrill et al. ................ 705/27 |
| 6,496,928 | B1 * | 12/2002 | Deo et al. .................... 713/153 |
| 6,516,416 | B2 * | 2/2003 | Gregg et al. ................... 726/8 |
| 6,535,857 | B1 * | 3/2003 | Clarke et al. ................. 705/28 |
| 6,542,874 | B1 * | 4/2003 | Walker et al. ................. 705/23 |
| 6,612,488 | B2 * | 9/2003 | Suzuki ....................... 235/380 |
| 6,813,039 | B1 * | 11/2004 | Silverbrook et al. ....... 358/1.18 |
| 6,825,945 | B1 * | 11/2004 | Silverbrook et al. ....... 358/1.15 |

FOREIGN PATENT DOCUMENTS

JP          2001-125950        *   5/2001

OTHER PUBLICATIONS

White, Ron, How Computers Work, Millennium Ed. Que Corporation, Sep. 1999.*

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Muller, Nathan J., Desktop Encyclopedia of the Internet, Artech House, Inc., 1998.*

Subscriber Agreement: ICLE Online book, dateand author unknown.*

* cited by examiner

APPARATUS AND METHOD FOR PROVIDING AND/OR FOR FULFILLING SUBSCRIPTION SERVICES

RELATED APPLICATIONS

This application claims the benefit of priority of U.S. Provisional Patent Application Ser. No. 60/154,740, filed Sep. 17, 1999, and entitled "APPARATUS AND METHOD FOR PROVIDING AND/OR FOR FULFILLING SUBSCRIPTION SERVICES", the subject matter and teachings of which is hereby incorporated by reference herein.

FIELD OF THE INVENTION

The present invention pertains to an apparatus and a method for providing and/or for fulfilling subscription services and, in particular, to an apparatus and a method for providing and/or for fulfilling subscription services for periodicals, newspapers, magazines, and/or other goods and/or services which can be the subject of subscriptions, in a network environment.

BACKGROUND OF THE INVENTION

Many individuals choose to subscribe to periodicals, newspapers, magazines, and/or other goods and/or services which can be the subject of subscriptions. Typically, these subscriptions involve the regular mailing and/or delivery of these periodicals, newspapers, magazines, and/or other goods and/or services, to the individual's residence, place of business and/or any other designated location or place.

These periodicals, newspapers, magazines, and/or other goods and/or services, are also typically available at newsstands, magazine stands, in stores, and/or at other places of business. It is typical that the subscriber of any of these periodicals, newspapers, magazines, and/or other goods and/or services, will receive a substantial discount on the respective periodicals, newspapers, magazines, and/or other goods and/or services, from the retail pries, newsstand prices, and/or cover or full retail prices of the respective periodicals, newspapers, magazines, and/or other goods and/or services.

Unfortunately, many subscribers sometimes find that home delivery, office delivery, and/or delivery to another location is not fully satisfactory or convenient. Subscribers may find that they may be away from home and/or the office and, therefore, not have the periodical, newspaper, magazine, and/or other good and/or service, available for their immediate use or enjoyment. In other instances, the delivery of the periodical, newspaper, magazine, and/or other good and/or service, may be late, such as after the subscriber leaves the delivery destination.

For example, a subscriber may leave for work well before a newspaper is delivered thereby depriving the individual of the newspaper until the individual returns home or requiring the individual to purchase the same newspaper at a newsstand, thereby resulting in a double purchase.

In other instances, a periodical, newspaper, magazine, and/or other good and/or service, may be unused and/or wasted such at times when the individual is away, such as on vacation, or when the individual's schedule prohibits him or her from utilizing and/or enjoying the respective periodical, newspaper, magazine, and/or other good and/or service. In these instances, a portion of the subscription is wasted.

The above-described disadvantages which are associated with subscriptions are due, in part, to the typically inflexible nature of subscriptions which typically require a delivery at a certain destination at a certain delivery frequency. As can be seen, this inflexibility can lead to great dissatisfaction with subscriptions and subscription services.

SUMMARY OF THE INVENTION

The present invention provides an apparatus and a method for providing and/or for fulfilling subscription services for periodicals, newspapers, magazines, and/or any other good or service which could be the subject of a subscription and/or any other good and/or services provided pursuant to a relationship, contractual and/or otherwise, which provides for a regular transaction between the parties. The present invention can be utilized in fashioning an efficient manner for disseminating to a subscriber and/or a regular purchaser any good or service which can be provided in commerce.

The present invention provides an apparatus which provides flexibility in the subscription fulfillment process as well as provides flexibility in subscription itself. The present invention provides for a subscription fulfillment program which allows a subscriber to physically pick-up or obtain the respective periodical, newspaper, magazine, and/or other good or service, from a respective retail outlet or store, thereby eliminating any inconveniences which can be caused by relying on conventional home or office delivery. This provides flexibility in that an individual subscriber may obtain the respective periodical, newspaper, magazine, and/or other good or service, when he or she so desires.

The present invention provides an apparatus and a method which processes the physical pick-up of the respective periodical, newspaper, magazine, and/or other good or service, and registers same in conjunction with the subscription fulfillment process.

The present invention also provides flexibility in the subscription itself. By processing the physical pick-up of the respective periodical, newspaper, magazine, and/or other good or service, and by accordingly registering same, the present invention facilitates the provision of a subscription which can be flexible in length of subscription period. In this manner, an individual subscriber may forego certain issues of the respective periodical, newspaper, magazine, and/or other good or service, without losing the ability to obtain future and/or additional issues in the future and thereby safeguarding and/or protecting the value of the subscription.

The present invention also provides for an improved apparatus and a method for processing subscription applications and/or requests as well as subscription renewals, extensions, and/or terminations.

The apparatus includes a central subscription processing computer which processes subscription orders and/or subscription requests and establishes subscriptions and/or subscription accounts for the respective subscribers to any of the respective periodicals, newspapers, magazines, and/or other goods or services, described herein. The apparatus can also include a central subscription fulfillment processing computer which processes data and/or information regarding and/or involving fulfillment services for the respective subscriptions.

The apparatus also includes a communication device which can be utilized in order to communicate with each of the central subscription processing computer and the central subscription fulfillment processing computer.

The communication device can be utilized in order to communicate with the central subscription processing computer and the central subscription fulfillment processing computer. The communication device can transmit signals to, as well as receive signals from, each of the central subscription processing computer and the central subscription fulfillment processing computer.

The apparatus also includes a point-of-sale transaction device which processes point-of-sale transactions and/or retail transactions involving the respective periodicals, newspapers, magazines, and/or other goods or services, which are the subject of the respective subscription. The point-of-sale transaction device can communicate with each of the central subscription processing computer and the central subscription fulfillment processing computer. The point-of-sale transaction device can transmit signals to, as well as receive signals from, each of the central subscription processing computer and the central subscription fulfillment processing computer.

The point-of-sale transaction device can transmit signals to, and receive signals from, the communication device. In this manner, any of the central subscription processing computer, the central subscription fulfillment processing computer, communication device, and/or the point-of-sale transaction device, may communicate with each other.

A plurality of point-of-sale devices can be utilized, with each device being utilized at and for a separate retail location or at a separate retail site at a retail location. A plurality of communication devices can be utilized with each communication device being associated with a subscriber. The communication device can also be located at a public location and may be a public kiosk.

The central subscription processing computer may be a single computer and/or computer system and/or may include a plurality of computers and/or computer systems. Similarly, the central subscription fulfillment processing computer may be a single computer and/or computer system and/or may include a plurality of computers and/or computer systems.

The apparatus of the present invention can be utilized over any suitable communication network and/or system. The communications networks and/or systems on, or over, which the present invention may be utilized, can include any one or combination of telecommunication networks or systems, satellite communication networks or systems, radio communication networks or systems, digital communication networks or systems, digital satellite communication networks or systems, personal communications services networks or systems, cable television networks or systems, broadband communication networks or systems, low earth orbiting satellite (LEOs) networks or systems, as well as in, or on any internets and/or intranets, the Internet, the World Wide Web, and any other suitable communication network or system.

The apparatus of the present invention can also be utilized on, or over, the Internet and/or the World Wide Web, and/or on, or over, any other suitable communication network or combination of communication networks.

The apparatus and method of present invention can be utilized in order to order and/or to initiate subscriptions, to renew subscriptions, to extend the term of the subscriptions, and/or to cancel and/or to terminate subscriptions, and/or to service and/or to fulfill subscriptions, for any of the subscription, and for any of the periodicals, newspapers, magazines, and/or goods and/or services which can be the subject of the respective subscriptions.

The apparatus and method of the present invention can facilitate the servicing and/or fulfillment of subscriptions in a network environment. The apparatus and method of the present invention can also facilitate providing subscriptions which have flexibility in the servicing and/or fulfillment of same as well as facilitates providing subscriptions which have flexibility in the length and/or the duration of the subscription.

The apparatus and method of the present invention can also provide a centralized subscription processing and/or service and/or fulfillment apparatus or system and/or a subscription processing and/or subscription fulfillment clearinghouse. The apparatus and method of the present invention can also provide notification to subscribers and/or other parties regarding subscription offers, changes and/or information regarding an event, occurrence and/or happening regarding any of the subscriptions and/or any of the services described herein.

The present invention can be utilized in conjunction with subscriptions involving periodicals, magazines, newspapers and/or any other informational and/or entertainment publications.

The subscription can be for conventional printed periodicals, periodicals in electronic form or "e-periodicals", and/or periodicals in any other form. The present invention can be utilized in conjunction with subscriptions regarding any good and/or service which can be the subject of commerce. In this regard, the subscriptions described herein can involve, but not be limited to, subscriptions for and/or regarding movie rentals, video rentals, movie tickets, show tickets, airline tickets, bus tickets, gasoline purchases, postage stamps and/or postage, meals tickets, tickets to sporting events, tickets to entertainment events, tickets to theater performances, professional services, contracted for services, and/or any other good and/or service which can be the subject of commerce.

Any of the communications which occur and/or which transpire between any of the computers and/or devices, and/or which occurs between any individual subscribers and/or operators and/or administrators of any of the computers and/or devices, can be effected by or via electronic mail (e-mail), electronic message transmission, telephone message, voice mail message, pager message, beeper message, conventional mail letter or message, letter, telephone call, and/or any other manner and/or mode of communication.

The present invention can provide for, and can perform fulfillment services for, and regarding, subscriptions which have flexibility in when issues can be obtained and/or skipped while still providing the individual subscriber with the value of, and/or with the number of subscriptions which the individual subscriber has contracted for. The amount of subscription flexibility can be dictated by each subscription providing and/or offering entity.

The central subscription processing computer and/or the central subscription fulfillment processing computer can provide processing for any number and/or type of subscriptions. The central subscription processing computer and/or the central subscription fulfillment processing computer can administer, manage, service, and/or provide processing, for any number and/or types of subscriptions.

The apparatus and method of the present invention can provide for subscriptions which can be initiated and/or created via any communication device and/or any point-of-sale transaction device.

The subscriptions can be fulfilled and/or serviced by any retail and/or other facility. In this manner, an individual subscriber may initiate a subscription for a periodical from any location and pick up the issues of the subscription from any retail facility, newsstand and/or store which is a participating facility and/or a facility which utilizes the present invention and/or which utilizes an appropriate point-of-sale transaction device. In this manner, flexibility is provided regarding the issue pick-up location.

The individual subscriber or an agent and/or other third party intermediary, can access the central subscription processing computer and/or the central subscription fulfillment processing computer, via the communication device and/or via the point-of-sale transaction device so as to ascertain the status of a subscription such as, but not limited to, whether the subscription is active or inactive, and/or the fulfillment status of the subscription, such as, but not limited to, the number of issues remaining, time for next renewal, etc.

The central subscription processing computer and/or the central subscription fulfillment processing computer can also notify individual subscribers, via any means, method and/or manner of communication, via the communication device and/or the point-of-sale transaction device, of available subscriptions, of subscription sales and/or specials, of available new issues, renewal notices, extension notices, termination notices, subscription creation and/or initiation notices, shipment to and/or arrival of the subscription issue, goods and/or services at a respective retail facility and/or other facility, and/or of any other information which may be of interest to an individual subscriber.

The apparatus and method of the present invention can be utilized as a subscription clearinghouse, to match individual subscribers with subscriptions, wherein information regarding any number of, and types of, subscriptions can be stored in the central subscription processing computer and/or the central subscription fulfillment processing computer. Any individual subscriber can access the respective central subscription processing computer and/or central subscription fulfillment processing computer and search for a desired subscription or subscriptions. The individual subscriber may then apply for, and/or purchase a subscription.

An individual subscriber can list an order for a subscription and/or subscriptions, with information regarding the order being stored in the central subscription processing computer and/or the central subscription fulfillment processing computer. The central subscription processing computer and/or the central subscription fulfillment processing computer can thereafter process the order or order and notify the individual via the communication device and/or the point-of-sale transaction device if and when the ordered subscription is available.

The individual subscriber may be notified via e-mail, electronic transmission, pager message, beeper message, telephone call, telephone message, letter, voice message, physical mail delivery, and/or via any other appropriate means, method and/or technique.

Any of the central subscription processing computer(s), the central subscription fulfillment processing computer(s), the communication device(s), and/or the point-of-sale transaction device(s), can be programmed for automatic operation, self-activation, and/or programmed operation. The central subscription processing computer and/or the central subscription fulfillment processing computer can be programmed to automatically generate and/or to transmit messages and/or notices to any of the individual subscribers, retailers, goods and/or services providers, etc., regarding subscriptions, subscription fulfillment, the availability of subscriptions, availability of issues and/or goods and/or services which are the subject of a subscription.

Intelligent agents, software agents, and/or mobile agents, can be utilized so as to act on behalf of any of the parties and/or any of the respective computers and/or devices described herein.

Accordingly, it is an object of the present invention to provide an apparatus and a method for providing and/or fulfilling subscription services.

It is another object of the present invention to provide an apparatus and a method for providing and/or fulfilling subscription services, in a network environment.

It is still another object of the present invention to provide an apparatus and a method for providing and/or fulfilling subscription services which allows an individual subscriber to control the manner in which the subscription is fulfilled.

It is yet another object of the present invention to provide an apparatus and a method for providing and/or fulfilling subscription services which provides for flexibility, as to time, location, and/or good or service provider, in the fulfillment of the subscription.

It is another object of the present invention to provide an apparatus and a method for providing and/or for fulfilling subscription services which provides for a subscription which is characterized by a subscription period, term and/or duration, which allows an individual subscriber to skip issues, goods and/or services, which are the subject of the subscription while still allowing the individual subscriber to obtain and/or to benefit from the value of the subscription.

It is still another object of the present invention to provide an apparatus and a method for providing and/or for fulfilling subscription services which facilitates an initiation of a subscription, a renewal of a subscription, an extension of a subscription, and/or the cancellation and/or termination of a subscription.

It is yet another object of the present invention to provide an apparatus and a method for providing and/or for fulfilling subscription services which provides notification to an individual subscriber regarding subscriptions, status of their subscriptions, information regarding fulfillment of subscriptions, and/or status of fulfillment of their subscriptions.

It is another object of the present invention to provide an apparatus and a method for providing and/or for fulfilling subscription services which provides for a flexible subscription as well as a flexible subscription fulfillment.

It is still another object of the present invention to provide an apparatus and a method for providing and/or for fulfilling subscription services which allows a subscriber to physically pick-up or obtain the issue, good or service, which is the subject of the subscription.

It is yet another object of the present invention to provide an apparatus and a method for providing and/or for fulfilling subscription services which provides and/or processes subscription initiations, renewals, extensions, and/or terminations.

It is another object of the present invention to provide an apparatus and a method for providing and/or for fulfilling subscription services which can be utilized in conjunction with point-of-sale transaction devices, personal computers, personal communication devices, public communication devices and/or kiosks.

It is still another object of the present invention to provide an apparatus and a method for providing and/or for fulfilling subscription services which can be utilized on, over, and/or in conjunction with, any communication system.

It is yet another object of the present invention to provide an apparatus and a method for providing and/or for fulfilling subscription services which can be utilized on, over, and/or in conjunction with, the Internet and/or the World Wide Web.

It is another object of the present invention to provide an apparatus and a method for providing and/or for fulfilling subscription services which provides for centralized subscription processing and/or service and/or fulfillment services processing for any kind and/or type of subscription.

It is still another object of the present invention to provide an apparatus and a method for providing and/or for fulfilling subscription services which provides for processing of subscription payment information.

It is yet another object of the present invention to provide an apparatus and a method for providing and/or for fulfilling subscription services provide notification regarding available subscriptions, subscription sales and/or specials, available new issues, renewal notices, extension notices, termination notices, subscription creation and/or initiation notices, shipment to and/or arrival of a subscription issue, goods and/or services, at a respective retail facility and/or other facility, and/or of any other information which may be of interest to an individual subscriber.

It is another object of the present invention to provide an apparatus and a method for providing and/or for fulfilling subscription services which provides a clearinghouse for matching individual subscribers to subscriptions.

It is still another object of the present invention to provide an apparatus and a method for providing and/or for fulfilling subscription services which provides for an apparatus which is programmed to provide any of the functionality described herein.

It is yet another object of the present invention to provide an apparatus and a method for providing and/or for fulfilling subscription services which can be utilized in conjunction with intelligent agents, software agents, and/or mobile agents.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENTS

Figure 1:
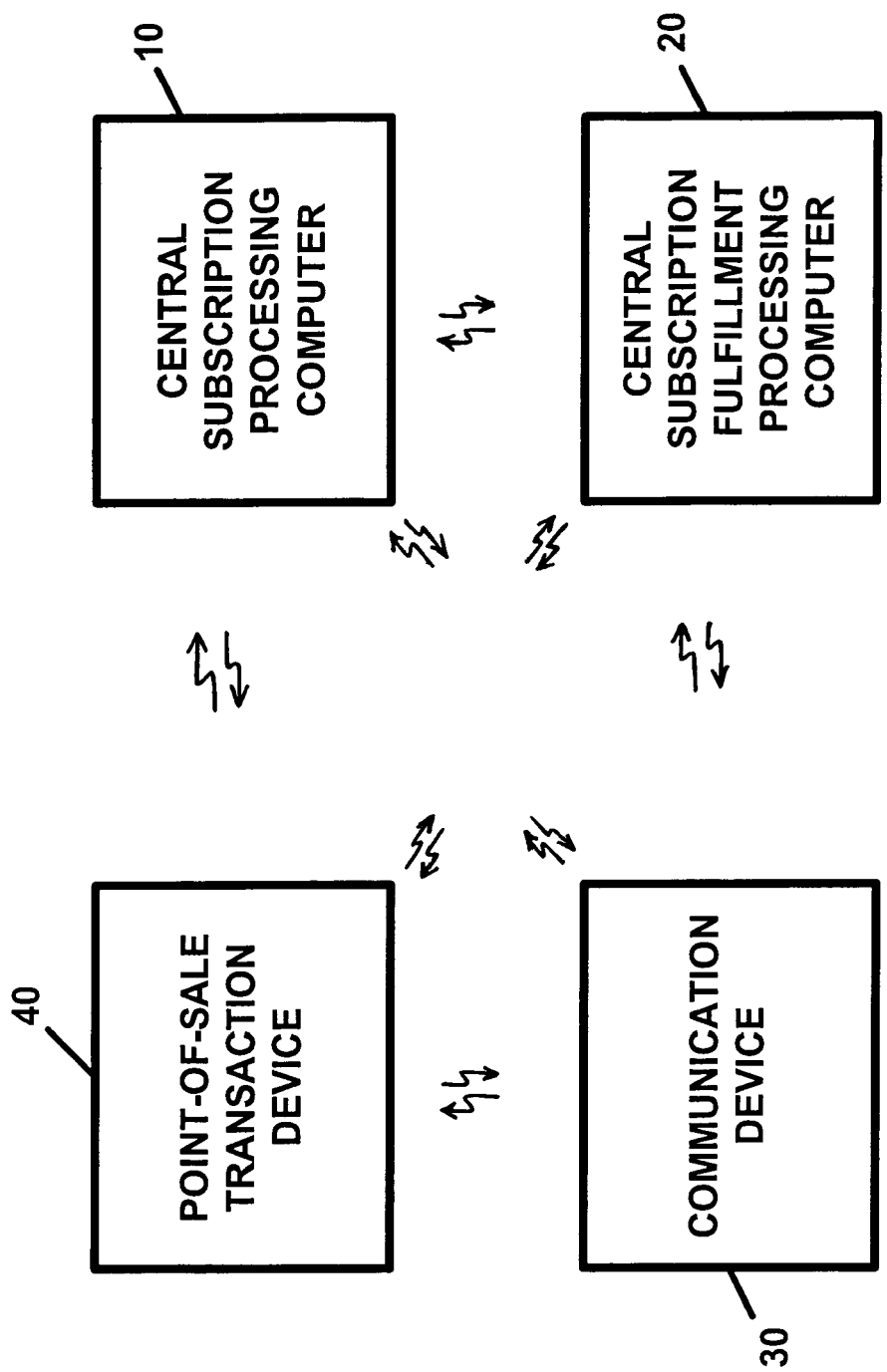
FIG. 1 illustrates the apparatus of the present invention, in block diagram form.

The present invention provides an apparatus and a method for providing and/or for fulfilling subscription services for periodicals, newspapers, magazines, and/or any other good or service which could be the subject of a subscription and/or any other good and/or services provided pursuant to a relationship, contractual and/or otherwise, which provides for a regular transaction between the parties. The present invention can be utilized in fashioning an efficient manner for disseminating to a subscriber and/or a regular purchaser any good or service which can be provided in commerce.

The present invention provides an apparatus which provides flexibility in the subscription fulfillment process as well as provides flexibility in the subscription itself.

The present invention provides for a subscription fulfillment program which allows a subscriber to physically pick-up or obtain the respective periodical, newspaper, magazine, and/or other good or service, from a respective retail outlet or store, thereby eliminating any inconveniences which can be caused by relying on conventional home or office delivery. This provides flexibility in that an individual subscriber may obtain the respective periodical, newspaper, magazine, and/or other good or service, when he or she so desires.

The present invention provides an apparatus and a method which processes the physical pick-up of the respective periodical, newspaper, magazine, and/or other good or service, and registers same in conjunction with the subscription fulfillment process.

The present invention also provides flexibility in the subscription itself. By processing the physical pick-up of the respective periodical, newspaper, magazine, and/or other good or service, and by accordingly registering same, the present invention facilitates the provision of a subscription which can be flexible in length of subscription period. In this manner, an individual subscriber may forego certain issues of the respective periodical, newspaper, magazine, and/or other good or service, without losing the ability to obtain future and/or additional issues in the future and thereby safeguarding and/or protecting the value of the subscription. For example, an individual may forego picking up an issue of a newspaper or magazine and, depending on the conditions of the subscription, be entitled to extend his or her subscription and/or ability to receive a number of future issues of the newspaper or magazine, thereby providing flexibility in the subscription period.

The present invention also provides for an improved apparatus and a method for processing subscription applications and/or requests as well as subscription renewals, extensions, and/or terminations.

Applicant hereby incorporates by reference herein the subject matter and teachings of U.S. Provisional Patent Application Ser. No. 60/154,740 which teaches and discloses an apparatus and method for providing and/or for fulfilling subscription services.

The term "subscription provider", and/or any plural use thereof, refers to any provider of any of the subscriptions described herein, and/or any agent, broker, and/or third party acting on behalf or the subscription provider, publisher, goods provider, service provider, and/or any other relevant entity.

The term "subscription fulfillment provider", and/or any plural use thereof, refers to any provider of services for fulfilling any of the herein described subscriptions described herein.

The term "subscriber", and/or any plural use thereof, refers to any subscribing individual, business, institution, and/or entity, of any of the subscription goods and/or services described herein.

FIG. 1 illustrates the apparatus of the present invention in block diagram form. The apparatus is generally denoted by the reference numeral 100. The apparatus 1 includes a central subscription processing computer 10. The central subscription processing computer 10 processes subscription orders and/or subscription requests and establishes subscriptions and/or subscription accounts for the respective subscribers to any of the respective periodicals, newspapers, magazines, and/or other goods or services, described herein.

The apparatus 1 also includes a central subscription fulfillment processing computer 20 which processes data and/or information regarding and/or involving fulfillment services for the respective subscriptions.

In the preferred embodiment, each of the central subscription processing computer 10 and the central subscription fulfillment processing computer 20 are computers and/or computer systems and may be any suitable server computer, network computer, mainframe computer, mini-computer, personal computer, and/or any other computer and/or computer system which is suitable for performing the respective processing functions of the respective computers in a network environment.

The apparatus 1 also includes a communication device 30 which, in the preferred embodiment, is utilized in order to communicate with each of the central subscription processing computer 10 and the central subscription fulfillment processing computer 20. In the preferred embodiment, the communication device can be a personal computer, a home computer, a personal digital assistant, a telephone, a wireless telephone, a cellular telephone, a hand-held computer, a palm-top computer, and/or any other computer and/or communication device.

The communication device 30 is utilized, in the manner described herein, in order to communicate with the central subscription processing computer 10 and the central subscription fulfillment processing computer 20. In this regard, the communication device 30 can transmit signals to, as well as receive signals from, each of the central subscription processing computer 10 and the central subscription fulfillment processing computer 20.

The apparatus also includes a point-of-sale transaction device 40. The point-of-sale transaction device 40 processes point-of-sale transactions and/or retail transactions involving the respective periodicals, newspapers, magazines, and/ or other goods or services, which are the subject of the respective subscription. The point-of-sale transaction device 40 communicates with each of the central subscription processing computer 10 and the central subscription fulfillment processing computer 20. In this regard, the point-of-sale transaction device 40 can transmit signals to, as well as receive signals from, each of the central subscription processing computer 10 and the central subscription fulfillment processing computer 20.

In the preferred embodiment, the point-of-sale transaction device 40 can transmit signals to, and receive signals from, the communication device 30. In this manner, any of the central subscription processing computer 10, the central subscription fulfillment processing computer 20, communication device 30 and/or the point-of-sale transaction device 40, may communication with each other.

In the preferred embodiment, a plurality of point-of-sale devices 40 can be utilized, with each device 40 being utilized at and for a separate retail location or at a separate retail site at a retail location. In the preferred embodiment, a plurality of communication devices 30 can be utilized with each communication device 30 being associated with a subscriber. The communication device 30 may also be located at a public location and may be a public kiosk.

The central subscription processing computer 10 may be a single computer and/or computer system and/or may include a plurality of computers and/or computer systems. In the same manner, the central subscription fulfillment processing computer 20 may be a single computer and/or computer system and/or may include a plurality of computers and/or computer systems.

The apparatus 1 of the present invention, in the preferred embodiment, is utilized over any suitable communication network and/or system.

The communications networks and/or systems on, or over, which the present invention may be utilized, can include any one or combination of telecommunication networks or systems, satellite communication networks or systems, radio communication networks or systems, digital communication networks or systems, digital satellite communication networks or systems, personal communications services networks or systems, cable television networks or systems, broadband communication networks or systems, low earth orbiting satellite (LEOs) networks or systems, as well as in, or on any internets and/or intranets, the Internet, the World Wide Web, and any other suitable communication network or system.

In a preferred embodiment, the apparatus 1 is utilized on, or over, the Internet and/or the World Wide Web. In other preferred embodiments, the apparatus 1 can also be utilized on, or over, any suitable communication network and/or any combination of communication networks.

Figure 2:
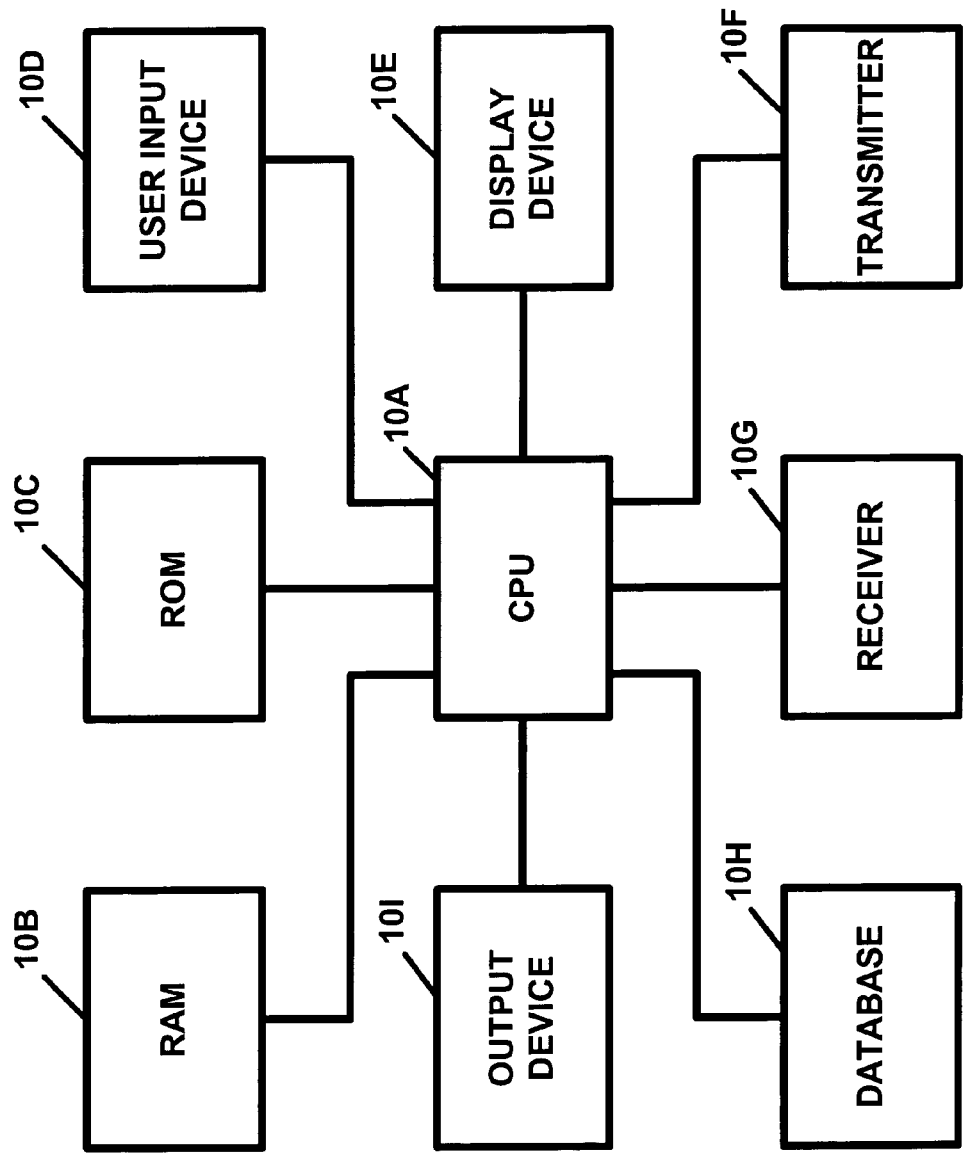
FIG. 2 illustrates the central subscription processing computer of FIG. 1, in block diagram form.

FIG. 2 illustrates the central subscription processing computer 10, in block diagram form. The central subscription processing computer 10, in the preferred embodiment, is a network computer or computer system which is utilized as a central subscription processing computer such as an Internet server computer and/or a web site server computer.

The central subscription processing computer 10 can also be any other computer or computer system which can be utilized in any communication network. In the preferred embodiment, the central subscription processing computer 10 includes a central processing unit or CPU 10A, which in the preferred embodiment, is a microprocessor. The CPU 10A may also be a microcomputer, a minicomputer, a macro-computer, and/or a mainframe computer, depending upon the application.

The central subscription processing computer 10 also includes a random access memory device(s) 10B (RAM) and a read only memory device(s) 10C (ROM), each of which is connected to the CPU 10A, a user input device 10D, for entering data and/or commands into the central subscription processing computer 10, which includes any one or more of a key pad, a keyboard, a scanner, a touch pad, a signature pad, a card reader, a magnetic strip card reader, a user pointing device, such as, for example, a mouse, a touch pad, and/or an audio input device and/or a video input device, etc., if desired, which input device(s) is also connected to the CPU 10A.

The central subscription processing computer 10 also includes a display device 10E for displaying data and/or information to a user or operator.

The central subscription processing computer 10 also includes a transmitter(s) 10F, for transmitting signals and/or data and/or information to any one or more of the central subscription processing computer(s) 10, the central subscription fulfillment processing computer(s) 20, the point-of-sale transaction devices 40, and the communication devices 30, which may be utilized in conjunction with the present invention. The central subscription processing computer 10 also includes a receiver 10G, for receiving signals and/or data and/or information from to any one or more of the central subscription processing computer(s) 10, the central subscription fulfillment processing computer(s) 20, the point-of-sale transaction devices 40, and the communication devices 30, which may be utilized in conjunction with the present invention.

The central subscription processing computer 10 also includes a database 10H. The database can include data and/or information regarding the publisher or entity which provides any of the periodicals, newspapers, magazines, for which subscriptions are provided and/or available via the apparatus of the present invention. The database 10H can also include data and/or information regarding the goods provider and/or the services provider for any of the respective goods and/or services for which subscriptions are provided and/or made available via the apparatus of the present invention.

The database 10H also includes data and/or information regarding the name of the respective periodicals, newspapers, magazines, and/or goods or services, which can be the subject of the subscriptions. The database 10H also includes data and/or information regarding the types of subscription available for the respective periodicals, newspapers, magazines, and/or goods or services, the length and/or duration of the respective subscriptions, the prices of the respective subscriptions, any conditions and/or miscellaneous information regarding the subscriptions available.

The database 10H also includes data and/or information regarding the individual subscribers, individuals, businesses, business entities, institutions, and/or others, who subscribe to any subscriptions via the apparatus of the present invention. The individual data and/or information can contain any pertinent information regarding the subscribers, such as sex, gender, age, educational level, occupation, marital status, and information regarding the individual's credit card(s), charge card(s), debit card(s), bank accounts, and/or other financial information for allowing the individual to pay for the respective subscriptions.

The database 10H also includes information regarding the subscriptions which each individual has subscribed to, type of subscription, subscription length or duration, subscription cost, subscription renewals, subscription extensions, issues or portions of subscriptions used and still available, any/or any other relevant information regarding the respective subscriptions and/or the fulfillment of the respective subscriptions.

In the case of business subscribers, the database 10H also includes data and/or information regarding the business subscribers, the name and address of the business subscribers, the businesses of the business subscribers, the sizes of the business subscribers, information regarding the business subscriber's credit card(s), charge card(s), debit card(s), bank accounts, and/or other financial information for allowing the business subscriber to pay for the respective subscriptions.

The database 10H also includes information regarding the subscriptions which each business subscriber has subscribed to, type of subscription, subscription length or duration, subscription cost, subscription renewals, subscription extensions, issues or portions of subscriptions used and still available, any/or any other relevant information regarding the respective subscriptions and/or the fulfillment of the respective subscriptions.

The database 10H also includes information regarding the date the respective subscriptions were ordered, became effective, date of the start of the subscription, date of subscription termination, retailer and/or subscription origination agent from who the subscription originated, and the retailer, goods provider, and/or services provider, subscription service entity, and/or subscription fulfillment entity and/or agent from whom the subscriber will obtain the respective periodicals, newspapers, magazines, and/or goods or services, which are be the subject of the subscriptions. The database 10H also includes information regarding customer service agents and/or entities for providing customer services for, and/or regarding, any of the respective subscriptions.

The database 10H may also contain any other information which may be relevant, pertinent, useful, and/or desired, for facilitating the operation of the apparatus and method of the present invention as described herein and/or as related thereto.

The database 10H, in the preferred embodiment, is a database which may include individual databases or collections of databases, with each database being designated to store any and all of the data and/or information described herein. Applicant hereby incorporates by reference herein the teachings of *Basic Business Statistics Concepts and Applications*, Mark L. Berenson and David M. Levine, $6^{th}$ Edition, Prentice Hall 1996.

The database 10H, or collection of databases, may be updated by each of the respective individual subscribers, central subscription processing computer operator or administrator, central subscription fulfillment processing computer operator or administrator, point-of-sale transaction device operator, communication device operator or administrator, via any of their respective computers and/or devices, and/or by any other third party, in real-time, and/or via dynamically linked database management techniques.

The data and/or information stored in the database 10H can also be updated by external sources. The database 10H will contain any and all information deemed necessary and/or desirable for providing all of the processing and/or services and/or functions described herein. Applicant hereby incorporates by reference herein the subject matter of *Fundamentals of Database Systems*, by Ramez Elmasri and Shamkant B. Navathe, $2^{nd}$ Ed., Addison-Wesley Publishing Company, 1994.

The database 10H can also include any contact information for any of the subscribers, subscription providers, subscription fulfillment providers, retailers, point-of-sale entities, etc., such as, but not limited to, names, addresses, telephone numbers, fax numbers, e-mail addresses, and/or any other contact information, for the respective party. The database 10H also includes any of the above-described contact information regarding any intermediaries, third parties, agents, and/or brokers, who utilize the apparatus of the present invention.

The database 10H can also include any other data and/or information needed and/or desired for facilitating the functions and operation of the present invention as described herein.

With reference once again to FIG. 2, the central subscription processing computer 10 also includes an output device 10I such as a printer, a modem, a fax/modem, or other output device, for providing data and/or information to the operator or user of the central subscription processing computer 10 or to a third party or third party entity.

Figure 3:
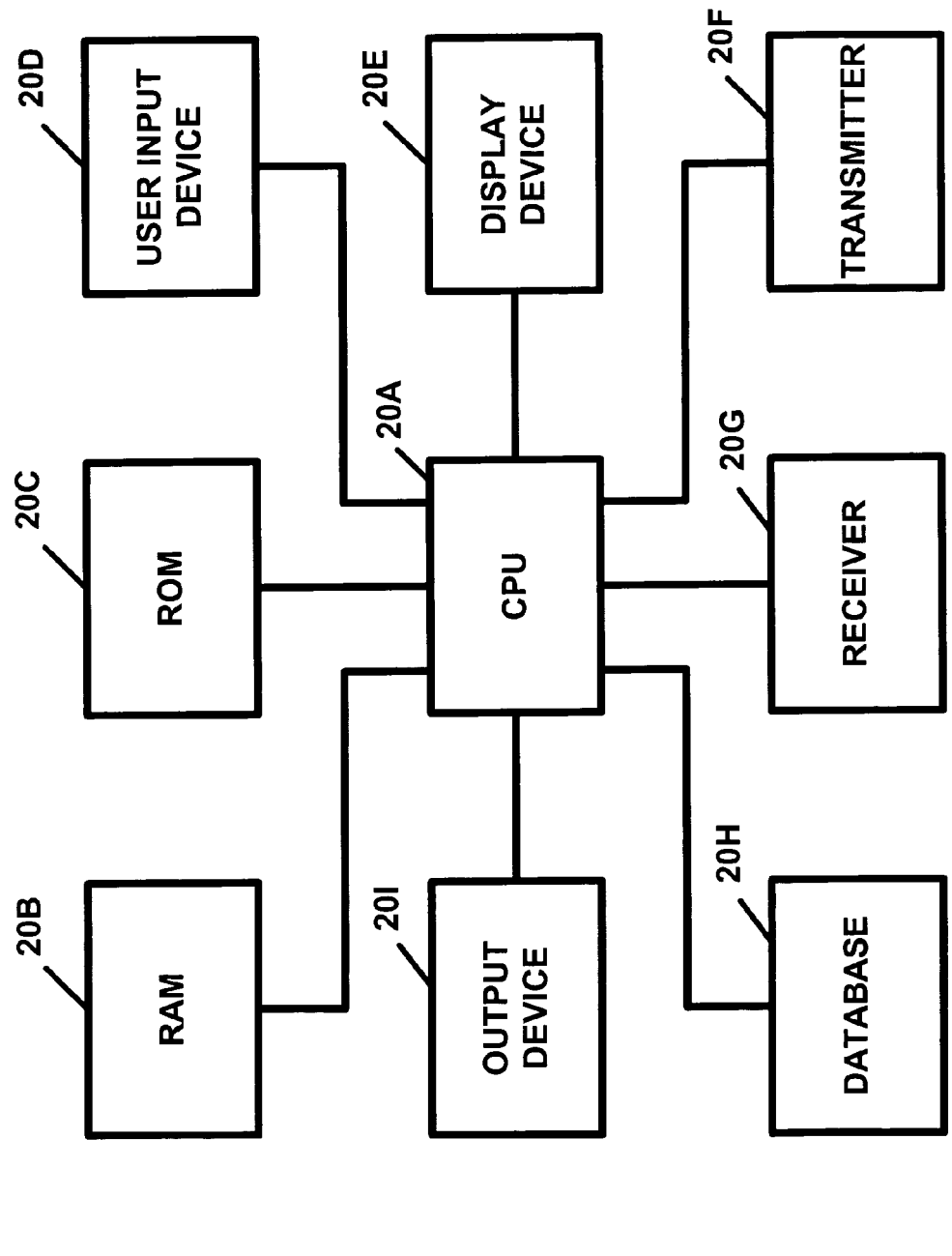
FIG. 3 illustrates the central subscription fulfillment processing computer of FIG. 1, in block diagram form.

FIG. 3 illustrates the central subscription fulfillment processing computer 20, in block diagram form. The central subscription fulfillment processing computer 20, in the preferred embodiment, is a network computer or computer system which is utilized as a central subscription fulfillment processing computer such as an Internet server computer and/or a web site server computer.

The central subscription fulfillment processing computer 20 can also be any other computer or computer system which can be utilized in any communication network. In the preferred embodiment, the central subscription fulfillment processing computer 20 includes a central processing unit or CPU 20A, which in the preferred embodiment, is a microprocessor. The CPU 20A may also be a microcomputer, a minicomputer, a macro-computer, and/or a mainframe computer, depending upon the application.

The central subscription fulfillment processing computer 20 also includes a random access memory device(s) 20B (RAM) and a read only memory device(s) 20C (ROM), each of which is connected to the CPU 20A, a user input device 20D, for entering data and/or commands into the central subscription fulfillment processing computer 20, which includes any one or more of a key pad, a keyboard, a scanner, a touch pad, a signature pad, a card reader, a magnetic strip card reader, a user pointing device, such as, for example, a mouse, a touch pad, and/or an audio input device and/or a video input device, etc., if desired, which input device(s) is also connected to the CPU 20A.

The central subscription fulfillment processing computer 20 also includes a display device 20E for displaying data and/or information to a user or operator.

The central subscription fulfillment processing computer 20 also includes a transmitter(s) 20F, for transmitting signals and/or data and/or information to any one or more of the central subscription fulfillment processing computer(s) 20, the central subscription processing computer(s) 10, the point-of-sale transaction devices 40, and the communication devices 30, which may be utilized in conjunction with the present invention. The central subscription fulfillment processing computer 20 also includes a receiver 20G, for receiving signals and/or data and/or information from to any one or more of the central subscription fulfillment processing computer(s) 20, the central subscription processing computer(s) 10, the point-of-sale transaction devices 40, and the communication devices 30, which may be utilized in conjunction with the present invention.

The central subscription fulfillment processing computer 20 also includes a database 20H. The database can include data and/or information regarding the publisher or entity which provides any of the periodicals, newspapers, magazines, for which subscriptions are provided and/or available via the apparatus of the present invention. The database 20H can also include data and/or information regarding the goods provider and/or the services provider for any of the respective goods and/or services for which subscriptions are provided and/or made available via the apparatus of the present invention.

The database 20H also includes data and/or information regarding the name of the respective periodicals, newspapers, magazines, and/or goods or services, which can be the subject of the subscriptions. The database 20H also includes data and/or information regarding the types of subscription available for the respective periodicals, newspapers, magazines, and/or goods or services, the length and/or duration of the respective subscriptions, the prices of the respective subscriptions, any conditions and/or miscellaneous information regarding the subscriptions available.

The database 20H also includes data and/or information regarding the individual subscribers, individuals, businesses, business entities, institutions, and/or others, who subscribe to any subscriptions via the apparatus of the present invention. The individual data and/or information can contain any pertinent information regarding the subscribers, such as sex, gender, age, educational level, occupation, marital status, and information regarding the individual's credit card(s), charge card(s), debit card(s), bank accounts, and/or other financial information for allowing the individual to pay for the respective subscriptions.

The database 20H also includes information regarding the subscriptions which each individual has subscribed to, type of subscription, subscription length or duration, subscription cost, subscription renewals, subscription extensions, issues or portions of subscriptions used and still available, any/or any other relevant information regarding the respective subscriptions and/or the fulfillment of the respective subscriptions.

In the case of business subscribers, the database 20H also includes data and/or information regarding the business subscribers, the name and address of the business subscribers, the businesses of the business subscribers, the sizes of the business subscribers, information regarding the business subscriber's credit card(s), charge card(s), debit card(s), bank accounts, and/or other financial information for allowing the business subscriber to pay for the respective subscriptions.

The database 20H also includes information regarding the subscriptions which each business subscriber has subscribed to, type of subscription, subscription length or duration, subscription cost, subscription renewals, subscription extensions, issues or portions of subscriptions used and still available, any/or any other relevant information regarding the respective subscriptions and/or the fulfillment of the respective subscriptions.

The database 20H also includes information regarding the date the respective subscriptions were ordered, became effective, date of the start of the subscription, date of subscription termination, retailer and/or subscription origination agent from who the subscription originated, and the retailer, goods provider, and/or services provider, subscription service entity, and/or subscription fulfillment entity and/or agent from whom the subscriber will obtain the respective periodicals, newspapers, magazines, and/or goods or services, which are be the subject of the subscriptions. The database 20H also includes information regarding customer service agents and/or entities for providing customer services for, and/or regarding, any of the respective subscriptions.

The database 20H may also contain any other information which may be relevant, pertinent, useful, and/or desired, for facilitating the operation of the apparatus and method of the present invention as described herein and/or as related thereto.

The database 20H, in the preferred embodiment, is a database which may include individual databases or collections of databases, with each database being designated to store any and all of the data and/or information described herein.

The database 20H, or collection of databases, may be updated by each of the respective individual subscribers, central subscription fulfillment processing computer operator or administrator, central subscription fulfillment processing computer operator or administrator, point-of-sale transaction device operator, communication device operator or administrator, via any of their respective computers and/or devices, and/or by any other third party, in real-time, and/or via dynamically linked database management techniques.

The data and/or information stored in the database 20H can also be updated by external sources. The database 20H will contain any and all information deemed necessary and/or desirable for providing all of the processing and/or services and/or functions described herein.

The database 20H can also include any contact information for any of the subscribers, subscription providers, subscription fulfillment providers, retailers, point-of-sale entities, etc., such as, but not limited to, names, addresses, telephone numbers, fax numbers, e-mail addresses, and/or any other contact information, for the respective party. The database 20H also includes any of the above-described contact information regarding any intermediaries, third parties, agents, and/or brokers, who utilize the apparatus of the present invention.

The database 20H can also include any other data and/or information needed and/or desired for facilitating the functions and operation of the present invention as described herein.

With reference once again to FIG. 3, the central subscription fulfillment processing computer 20 also includes an output device 20I such as a printer, a modem, a fax/modem, or other output device, for providing data and/or information to the operator or user of the central subscription fulfillment processing computer 20 or to a third party or third party entity.

Figure 4:
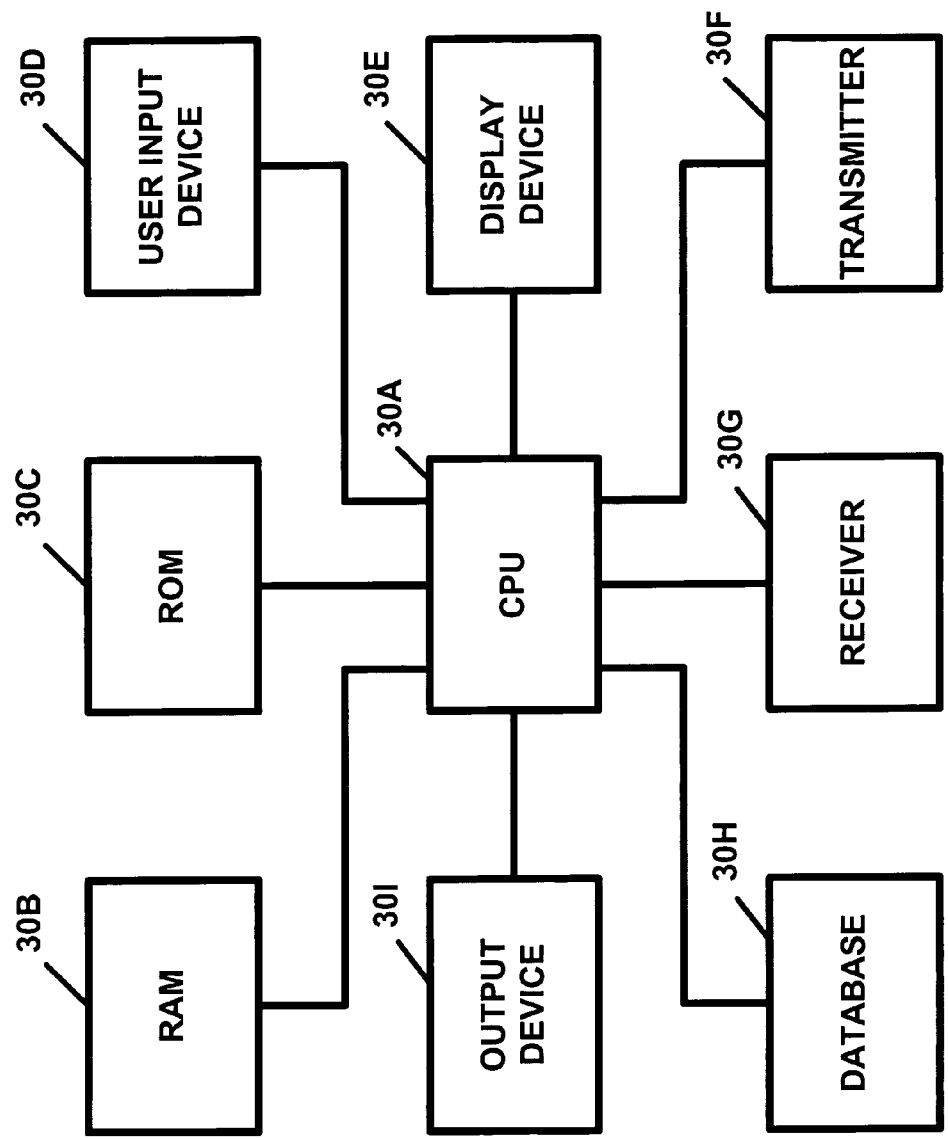
FIG. 4 illustrates the communication device of FIG. 1, in block diagram form.

FIG. 4 illustrates the communication device 30, in block diagram form. The communication device 30, in the preferred embodiment, is a personal computer, a personal digital assistant, a communication device, and/or any other suitable computer or communication device which can be utilized to access and/or to communicate with any of the central subscription processing computer(s) 10, central subscription fulfillment processing computer(s) 20, and/or any of the point-of-sale transaction devices 40, described herein. In the preferred embodiment, the communication device 30 includes a central processing unit or CPU 30A, which in the preferred embodiment, is a microprocessor. The CPU 30A may also be a microcomputer, a minicomputer, a macrocomputer, and/or a mainframe computer, depending upon the application.

The communication device 30 also includes a random access memory device(s) 30B (RAM) and a read only memory device(s) 30C (ROM), each of which is connected to the CPU 30A, a user input device 30D, for entering data and/or commands into the communication device 30, which includes any one or more of a key pad, a keyboard, a scanner, a touch pad, a signature pad, a card reader, a magnetic strip card reader, a user pointing device, such as, for example, a mouse, a touch pad, and/or an audio input device and/or a video input device, etc., if desired, which input device(s) is also connected to the CPU 30A. The communication device 30 also includes a display device 30E for displaying data and/or information to a individual user or operator.

The communication device 30 also includes a transmitter (s) 30F, for transmitting signals and/or data and/or information to any one or more of the central subscription processing computer(s) 10, the central subscription fulfillment processing computer(s) 20, and/or to any of the point-of-sale transaction devices 40, which may be utilized in conjunction with the present invention. The communication device 30 also includes a receiver 30G, for receiving signals and/or data and/or information from any one or more of the central subscription processing computer(s) 10, the central subscription fulfillment processing computer(s) 20, and/or to any of the point-of-sale transaction devices 40, which may be utilized in conjunction with the present invention.

The communication device 30 also includes a database(s) 30H which can contain any and/or all of the data and/or information described herein as being stored in the databases of central subscription processing computer(s) 10, the central subscription fulfillment processing computer(s) 20, and/or any of the point-of-sale transaction devices 40, described herein.

With reference once again to FIG. 4, the communication device 30 also includes an output device 30I such as a printer, a modem, a fax/modem, or other output device, for providing data and/or information to the operator or user of the communication device 30 or to a third party or third party entity.

Figure 5:
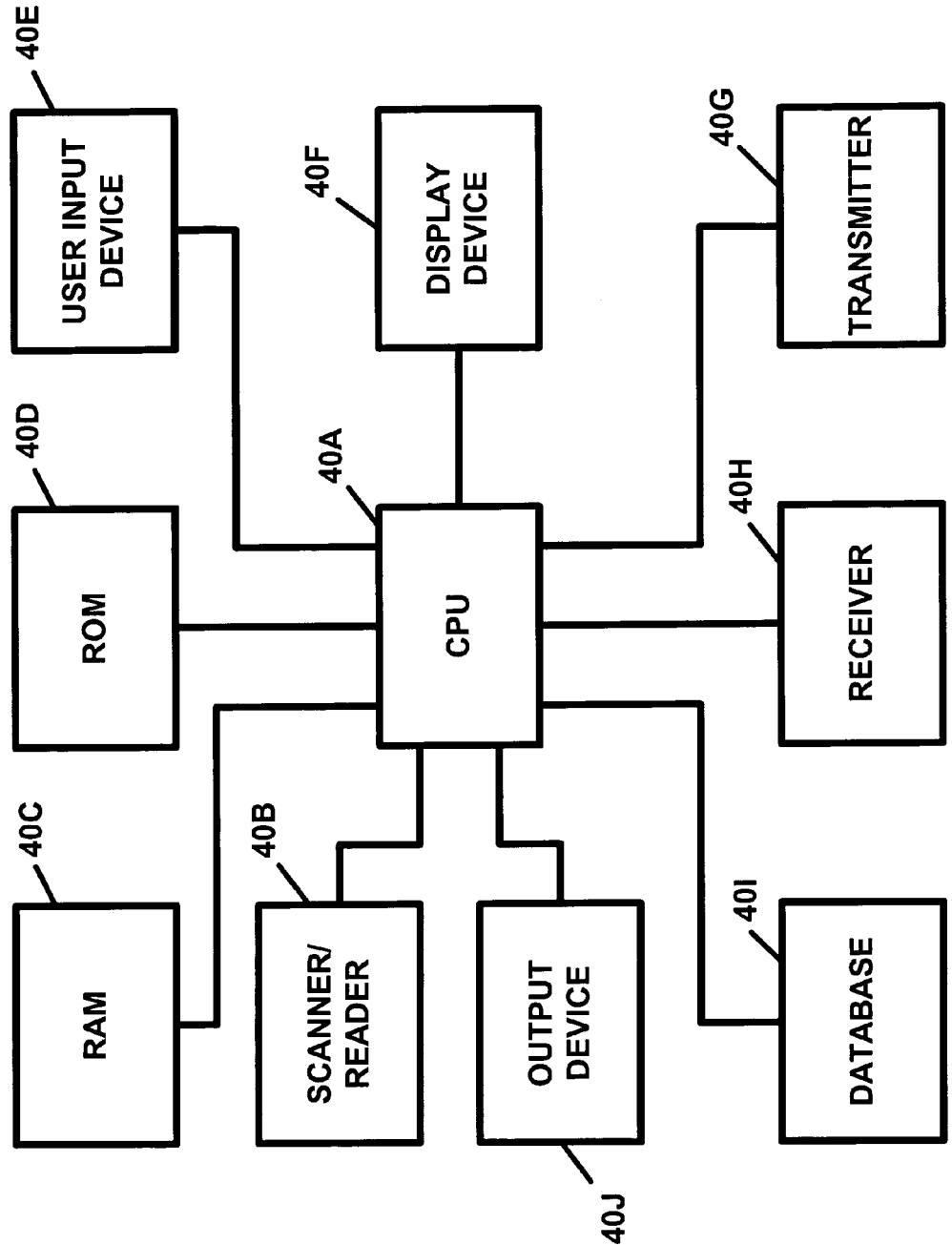
FIG. 5 illustrates the point-of-sale transaction device of FIG. 1, in block diagram form.

FIG. 5 illustrates the point-of-sale transaction device of FIG. 1, in block diagram form. In FIG. 5, the point-of-sale transaction device 40, in the preferred embodiment, includes a central processing unit or CPU 40A, a scanner/reader 40B, for scanning and/or reading any of the credit cards, charge cards, debit cards, value cards, smart cards, etc, which may be utilized in conjunction with the present invention. The scanner/reader 40A is connected to the CPU 40A. The point-of-sale transaction device 40 also includes associated random access memory 40C (RAM) and read only memory 40D (ROM) devices, which are also connected to the CPU 40A, a user input device 40E, which is typically any one or more of a key pad, a keyboard, a scanner, a touch pad, a signature pad, a card reader, a magnetic strip card reader, a user pointing device, such as, for example, a mouse, a touch pad, and/or an audio input device and/or a video input device, etc., if desired, or other suitable input device for inputting data into the point-of-sale transaction device 40 and which is also connected to the CPU 40A, and a display device 40F for displaying information and/or data to a user or operator, which display device 40F is also connected to the CPU 40A.

The point-of-sale transaction device 40 also includes a transmitter 40G for transmitting signals and/or data to the central subscription processing computer 10, the central subscription fulfillment processing computer 20, and/or the communication device 30 and/or to any other device associated with any of the subscription providers, the subscription fulfillment providers, and/or the subscribers described herein. The transmitter 40G is also connected to the CPU 40A. The point-of-sale transaction device 40 also includes a receiver 40H for receiving signals and/or data from any of the central subscription processing computer 10, the central subscription fulfillment processing computer 20, and/or the communication device 30, and/or to any other device associated with any of the subscription providers, the subscription fulfillment providers, and/or the subscribers described herein. The receiver 40H is also connected to the CPU 40A.

The point-of-sale transaction device 40 also includes a database 40I. The database 40I can include any of the data and/or information described herein as being stored and/or which can be stored in the databases 10H, 20H and/or 30H, of the respective central subscription processing computer (s) 10, the central subscription fulfillment processing computer(s) 20, and/or the communication device(s) 30, described herein.

The point-of-sale transaction device 40 also includes a printer 40J or other appropriate output device for outputting data to the operator. The printer 40J is also connected to the CPU 40A. In the preferred embodiment, the printer 40J prints receipts corresponding to any of the subscription transactions described herein as capable of being performed by the present invention.

The apparatus and method of present invention can be utilized in order to order and/or to initiate subscriptions, to renew subscriptions, to extend subscriptions, to cancel and/ or to terminate subscriptions, and/or to service and/or to fulfill subscriptions, for any of the subscription, and for any of the periodicals, newspapers, magazines, and/or goods and/or services which can be the subject of the respective subscriptions.

The apparatus and method of the present invention facilitates the servicing and/or fulfillment of subscriptions in a network environment. The apparatus and method of the present invention also facilitates providing subscriptions which have flexibility in the servicing and/or fulfillment of same as well as facilitates providing subscriptions which have flexibility in the length and/or the duration of the subscription.

The apparatus and method of the present invention also provides a centralized subscription processing and/or service and/or fulfillment apparatus or system and/or a subscription processing and/or subscription fulfillment clearinghouse. The apparatus and method of the present invention also provides notification to subscribers and/or other parties regarding subscription offers, changes and/or information regarding an event, occurrence and/or happening regarding any of the subscriptions and/or any of the services described herein.

In the herein-described preferred embodiment operations of the present invention, the present invention can be utilized in conjunction with subscriptions involving periodicals, magazines, newspapers ands/or any other informational and/or entertainment publications (hereinafter referred to collectively as "periodical" or "periodicals").

The subscription can be for conventional printed periodicals, periodicals in electronic form or "e-periodicals", and/or periodicals in any other form. Although described as being utilized in conjunction with subscriptions for periodicals, the preferred embodiment operations of the present invention can be utilized in conjunction with subscriptions regarding any good and/or service which can be the subject of commerce. In this regard, the subscriptions described herein can involve, but not be limited to, subscriptions for and/or regarding movie rentals, video rentals, movie tickets, show tickets, airline tickets, bus tickets, gasoline purchases, postage stamps and/or postage, meals tickets, tickets to sporting events, tickets to entertainment events, tickets to theater performances, professional services, contracted for services, and/or any other good and/or service which can be the subject of commerce.

Figure 6:
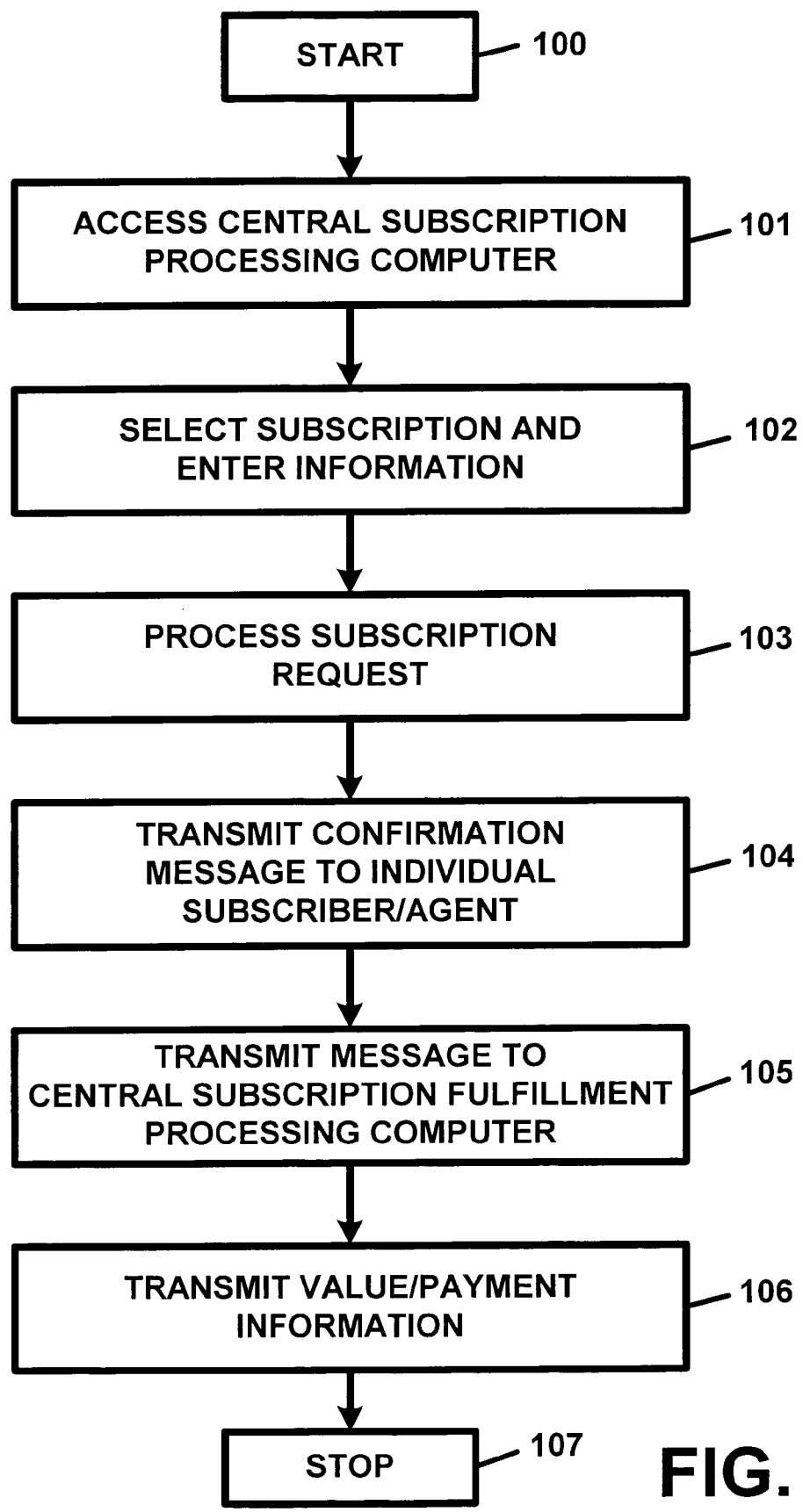
FIG. 6 illustrates a flow diagram of a preferred embodiment operation of the present invention in initiating a subscription.

FIG. 6 illustrates a flow diagram of a preferred embodiment operation of the present invention in creating and/or initiating a subscription to a periodical. In a preferred embodiment, the apparatus can initiate and/or create a subscription which allows the individual subscriber to pick-up the issues of the periodicals at a retail facility, such as at a newsstand and/or at a magazine stand, thereby allowing the individual subscriber the freedom and convenience of picking up issues at any desired time and/or from any desired retail facility.

The apparatus can also initiate and/or create a subscription which can be a conventionally deliverable subscription which can be initiated and/or created via an on-line transaction and which allows the individual subscriber to dictate subscription parameters such, but not limited to, subscription conditions, subscription terms of agreement, payment methods, subscription term or period, and/or in any other manner described herein.

Operation of the apparatus commences at step 100. At step 101, the individual subscriber can access the central subscription processing computer 10 via either the respective communication device 30 and/or the point-of-sale transaction device 40. In an alternative embodiment, the central subscription processing computer 10 can contact the individual via the individual's communication device 30.

At step 102, the individual subscriber, the respective communication device 30 or point-of-sale device 40, can select the periodical or periodicals which the individual subscriber wishes to subscribe to. At step 102, the individual subscriber also enters and or selects the term of the subscription and/or the number of issues for which the individual subscriber wishes to subscribe. The individual subscriber can also, at step 102, enter or select a payment method which may include payment by credit card, charge card, debit card, direct withdrawal from checking account or savings account, cash payment at the retail location and/or at the location of the point-of-sale transaction device 40, and/or via electronic money, electronic cash, electronic check, digital money, and/or digital cash, and/or via authorization to charge against and/or make payment form any of the herein-described accounts, via the respective communication device 30 and/or point-of-sale transaction device 40. The individual subscriber may also, at step 102, enter or select to pay for the subscription on a per issue basis.

At step 102, the individual subscriber may also select the manner and/or mode by which he, she, or it, desires to effect subscription transactions. The individual subscriber may elect to effect transactions, such as picking up an issue of the periodical and accounting for same by utilizing an access code or personal identification number (PIN) or code, by utilizing an account card having account and/or subscription information embedded in a magnetic strip or in an embedded microprocessor or micro-controller, by utilizing a credit card, a charge card, a debit card and/or any other device or entity for allowing the individual subscriber to effect a subscription transaction at the respective point-of-sale transaction device 40 and/or at the respective communication device 30.

At step 102, the individual subscriber can also enter and/or select any other information and/or instructions regarding the subscription, such as, for example, the number of issues desired, the length or duration of the subscription, the retail center and/or business where the individual subscriber desires or expects to pick-up and/or receive the issue or issues of the subscription periodical, and/or the retailer and/or business from which the individual subscriber desires and/or expects to receive delivery of the issue or issues of the subscription periodical. The number of issues, the length or duration of the subscription, and/or the servicing and/or fulfillment services and/or conditions, can be flexible and can be changed by the individual subscriber at any time and from any point-of-sale transaction device 40 and/or from any communication device 30 described herein.

In this manner, the apparatus and method of the present invention can be utilized to provide for flexible subscriptions and/or for flexibility in the servicing and/or fulfillment of any of the subscriptions.

At step 103, the central subscription processing computer 10, will process the subscription request and/or any other information and/or instructions entered and/or elected at step 102 and create the desired subscription.

At step 104, the central subscription processing computer 10 will transmit an appropriate confirmation message to the individual subscriber at the respective communication device 30 and/or at the respective point-of-sale transaction device 40, notifying the individual subscriber of the creation and/or the initiation of the subscription. At step 105, the central subscription processing computer 10 will transmit an appropriate message and/or signal to the central subscription fulfillment processing computer 20 to arrange for the fulfillment of the respective subscription. Steps 104 and 105 may be interchanged and, therefore, can be performed in any order.

At step 106, the central subscription processing computer 10 will transmit information, and/or any appropriate account card, smart card, and/or debit card, and/or any electronic and/or digital signals for programming any of the respective account card, smart card, and/or debit card, with any respective value for effecting the transactions pursuant to the subscription. The respective communication devices 30 and/or point-of-sale transaction devices 40 can also include any appropriate device for programming and/or transferring subscription value to any of the respective account cards, smart cards, and/or debit cards, described herein.

In any and/or all of the embodiments described herein, any of the communications which occur and/or which transpire between any of the computers and/or devices 10, 20, 30, and/or 40, described herein, and/or which occurs between any individual subscribers and/or operators and/or administrators of any of the computers and/or devices 10, 20, 30, and/or 40, can be effected by or via electronic mail (e-mail), electronic message transmission, telephone message, voice mail message, pager message, beeper message, conventional mail letter or message, letter, telephone call, and/or any other manner and/or mode of communication.

Once step 106 is completed, the subscription will be activated. Thereafter, the operation of the apparatus will cease at step 107.

Thereafter, the individual subscriber may access the central subscription processing computer 10, such as at step 101 and/or 102, and make changes to the subscription, renew the subscription, extend the term of the subscription, lengthen the subscription, shorten the subscription, change and/or modify any of the conditions and/or information and/or instructions regarding the subscription, described herein, and/or entered and/or selected by the individual subscriber as described with reference to the description of the flow diagram of FIG. 6 and/or otherwise. The central subscription processing computer 10 will thereafter process the change to the subscription and update the subscription data and/or information accordingly.

In this manner, the individual subscriber can renew a subscription, extend the term of the subscription, lengthen a subscription, shorten a subscription, change a retail or point-of-sale location for pick-up or receipt therefrom and/or for delivery therefrom. Subscription changes may be entered and/or selected by the individual subscriber in real-time and/or otherwise, via an respective communication device 30 and/or via any point-of-sale transaction device 40.

At any time, the individual subscriber can also access any central subscription processing computer 10 and/or any central subscription fulfillment processing computer 20 in order to determine the subscription status and/or to change, alter and/or modify, any of the information, described herein and/or otherwise, which is related to, and/or regarding, the subscription, the fulfillment of the subscription, the status of the subscription, and/or the subscription fulfillment status of the subscription and/or the service status of the subscription.

The respective central subscription processing computer 10 and/or the central subscription fulfillment processing computer 20 will thereafter process the change to the subscription and update the subscription data and/or information accordingly.

Figure 7A:
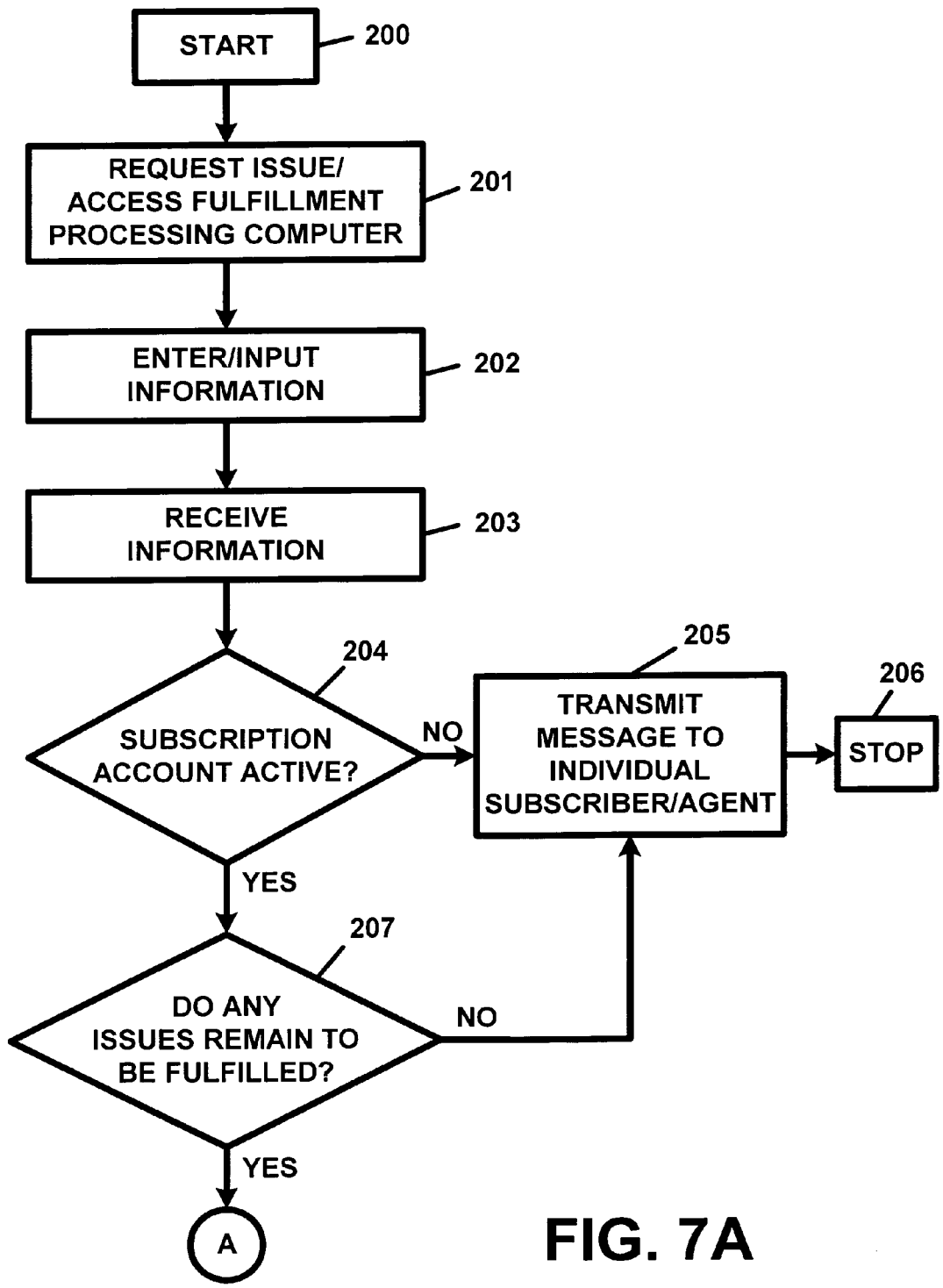
FIGS. 7A and 7B illustrate a flow diagram of a preferred embodiment operation of the present invention in providing fulfillment services for a subscription.
Figure 7B:
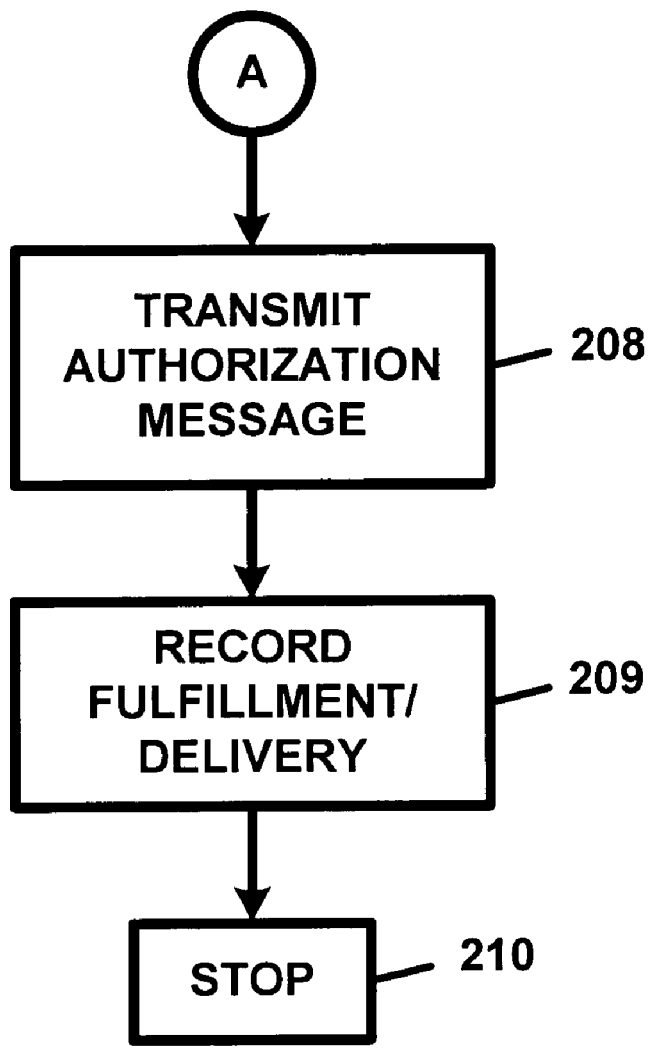

FIGS. 7A and 7B illustrate a flow diagram of another preferred embodiment operation of the apparatus and method of the present invention in fulfilling subscriptions and/or servicing subscriptions. In the embodiment of FIGS. 7A and 7B, the apparatus allows the individual subscriber to pick-up the issues of the periodicals at a retail facility, such as at a newsstand and/or at a magazine stand, thereby allowing the individual subscriber the freedom and convenience of picking up issues at any desired time and/or from any desired retail facility.

The operation of the present invention, as illustrated and described in FIGS. 7A and 7B, can typically be utilized once a subscription has been created via the method described herein with reference to FIG. 6, as well as by any other conventional subscription creating and/or initiation method.

In the preferred embodiment of FIGS. 7A and 7B, the apparatus of the present invention can also be utilized at the same time as, or in conjunction with, the creation and/or commencement of a subscription so as to provide for an immediate first issue of the periodical at the time, and or immediately following, the creation and/or commencement of the individual subscriber's subscription. In this manner, an individual subscriber can, for example, go to a retail facility, such as a magazine stand, request and enter into a subscription for a magazine, have the subscription initiated and/or created via the point-of-sale transaction device 40, and leave the retail facility with the first issue of his or her subscription magazine. In another preferred embodiment, the operation of the apparatus of the present invention, as described herein with reference to the embodiment of FIG. 6, can be readily and easily modified so as to provide the individual subscriber with a first issue of the subscription periodical and provide for an appropriate charging, debiting, and/or crediting, of the subscription account, as desired.

The operation of the embodiment of FIGS. 7A and 7B commences at step 200. At step 201, the individual subscriber desiring to pick up an issue of his periodical, and/or the salesperson or checkout person at the retail facility, can request the periodical issue by accessing the central subscription fulfillment processing computers 20 via the point-of-sale transaction device 40. Once the central subscription fulfillment processing computers 20 is accessed, subscription account information is entered into the point-of-sale transaction device 40, at step 202, by inputting same via the user input device 40E and/or by swiping a respective account card, smart card, credit card, charge card, debit card, and/or value card, utilized in conjunction with the subscription account, in the scanner/reader 40B.

At step 202, any other information regarding and/or further identifying the subscription account can also be entered and/or input. At step 203, the information entered and/or input at step 202 is transmitted to, and received by, the central subscription fulfillment processing computer 20. At step 204, the central subscription fulfillment processing computer 20 will process the information and determine whether the subscription account is still active. If, at step 204, it is determined that the subscription account is not active, the central subscription processing computer 20 will, at step 205, transmit a signal to the point-of-sale transaction device 40, to provide notification of the inactive or lapsed account.

Thereafter, operation of the present invention will cease at step 206 and the individual subscriber may thereafter, access the central subscription processing computer 10 in order to re-open and/or renew the subscription. In another preferred embodiment, the central subscription fulfillment processing computer 20 can transfer operation to the central subscription processing computer 10, at step 205. Thereafter, subscription account re-opening and/or renewal can occur on-line via the point-of-sale transaction device 40 and operation can proceed to step 202 to re-enter the pertinent account information. This preferred embodiment operation can facilitate a re-opening or renewal of the subscription account in one and the same interaction between the individual subscriber and the salesperson or check-out person at the retail facility.

If, at step 204, it is determined that the subscription account is still active, operation will proceed to step 207 and the central subscription fulfillment processing computer 20 will determine if any issues remain to be fulfilled on the subscription account. If, at step 207, it is determined that no issues remain to be fulfilled, then operation will proceed to step 205 described above and notification of this fact will be provided to the individual subscriber and/or the salesperson and/or checkout person via the point-of-sale transaction device 40.

Thereafter, operation of the apparatus will proceed as described above with operation either ceasing and/or the individual subscriber renewing the subscription, extending the term of the subscription, and/or purchasing additional issues and/or arranging for same.

If, at step 207, it is determined that issues remain to be fulfilled on the subscription account, then operation will proceed to step 208 and the central subscription fulfillment processing computer 20 will transmit a signal to the point-of-sale transaction device 40 authorizing the pick-up of the issue by the individual subscriber. In the preferred embodiment, at step 208, the point-of-sale device 40, will generate and print a receipt of the transaction, via the printer or output device 40I, for the retail facility for the facility's records. In the preferred embodiment, at step 208, the point-of-sale device 40, will also generate and print a receipt of the transaction, via the printer or output device 40I, for the individual subscriber for the individual subscriber's records.

At step 209, the central subscription fulfillment processing computer 20 will record the fulfillment of the issue delivery and/or transaction, decrease by one the number of issues remaining to be fulfilled on the subscription account, and provide all record updating for the subscription account.

The central subscription fulfillment processing computer 20, in the preferred embodiment, at step 209, will also update any and/or pertinent subscription account records and/or information, for the subscription account, in its database 20H as well as the corresponding records and/or information for the subscription account which are stored in the database 10H of the central subscription processing computer 10. These updates to the central subscription processing computer database 10H can be performed via transmitting an appropriate signal to the central subscription processing computer 10 and/or via dynamically linked database methods and/or techniques, and/or via nay other device, method and/or techniques known by those skilled in the art.

Thereafter, operation of the apparatus will cease at step 210.

In another preferred embodiment of the present invention, the apparatus and method of the present invention can provide for, and can perform fulfillment services for, and regarding, subscriptions which have flexibility regarding when issues can be obtained and/or skipped while still providing the individual subscriber with the value of, and/or with the number of subscriptions which the individual subscriber has contracted for. In this manner, an individual subscriber who knows ahead of time that he or she may not be able to utilize issues of the periodical at certain times, can forego obtaining same and effectively lengthen the subscription term or duration until he or she receives all issues.

For example, in one embodiment of such a flexible subscription account, an individual subscriber can enter a subscription for a monthly magazine whereby he or she will receive twelve (12) monthly issues within a fifteen (15) month period. If the individual subscriber obtains the twelve issues prior to the end of the fifteen month period he or she can simply renew the subscription as described herein and/or in any other appropriate manner.

The amount of subscription flexibility can be dictated by each subscription providing and/or offering entity.

Figure 8A:
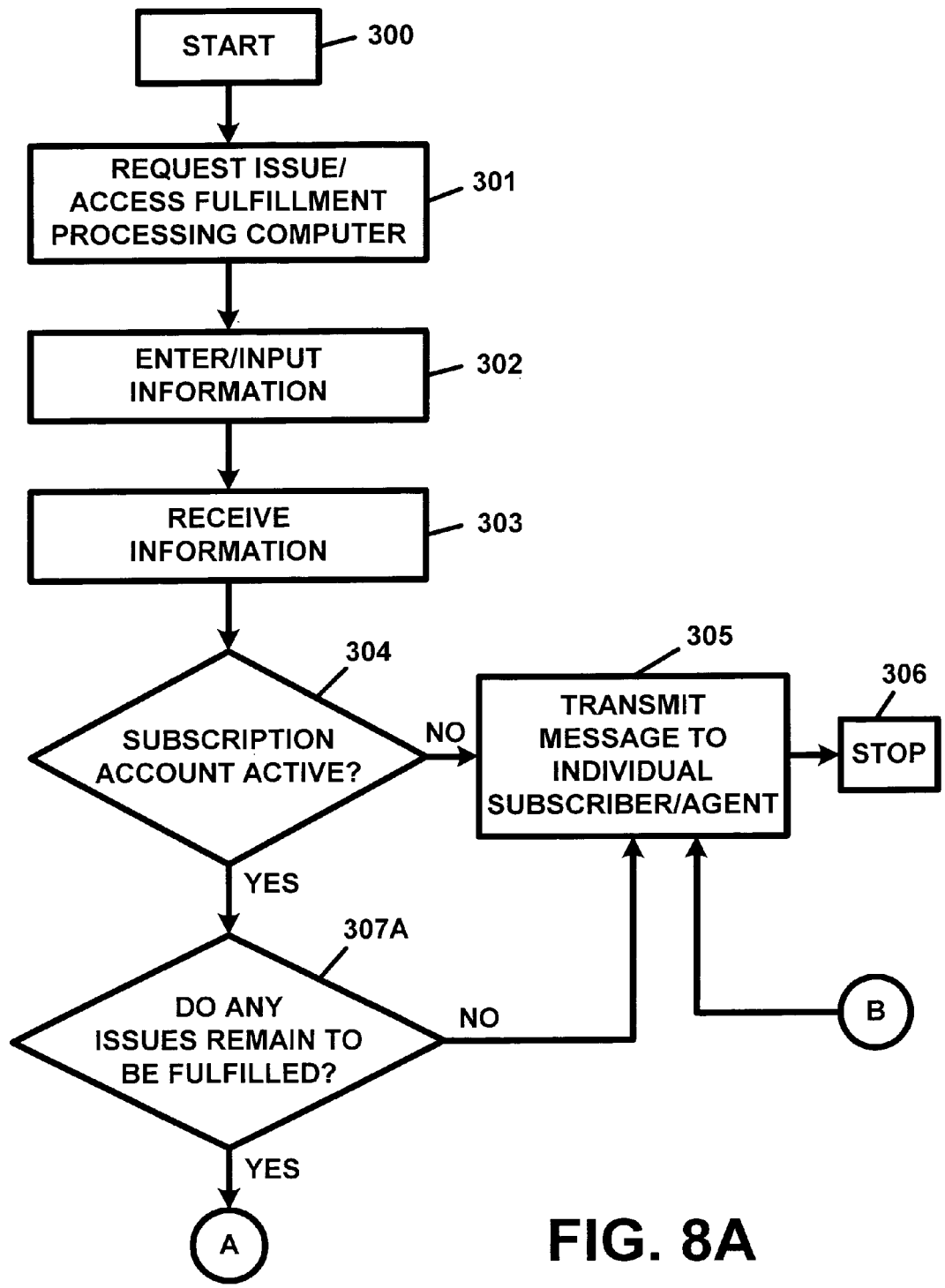
FIGS. 8A and 8B illustrate a flow diagram of another preferred embodiment operation of the present invention in providing fulfillment services for a subscription.
Figure 8B:
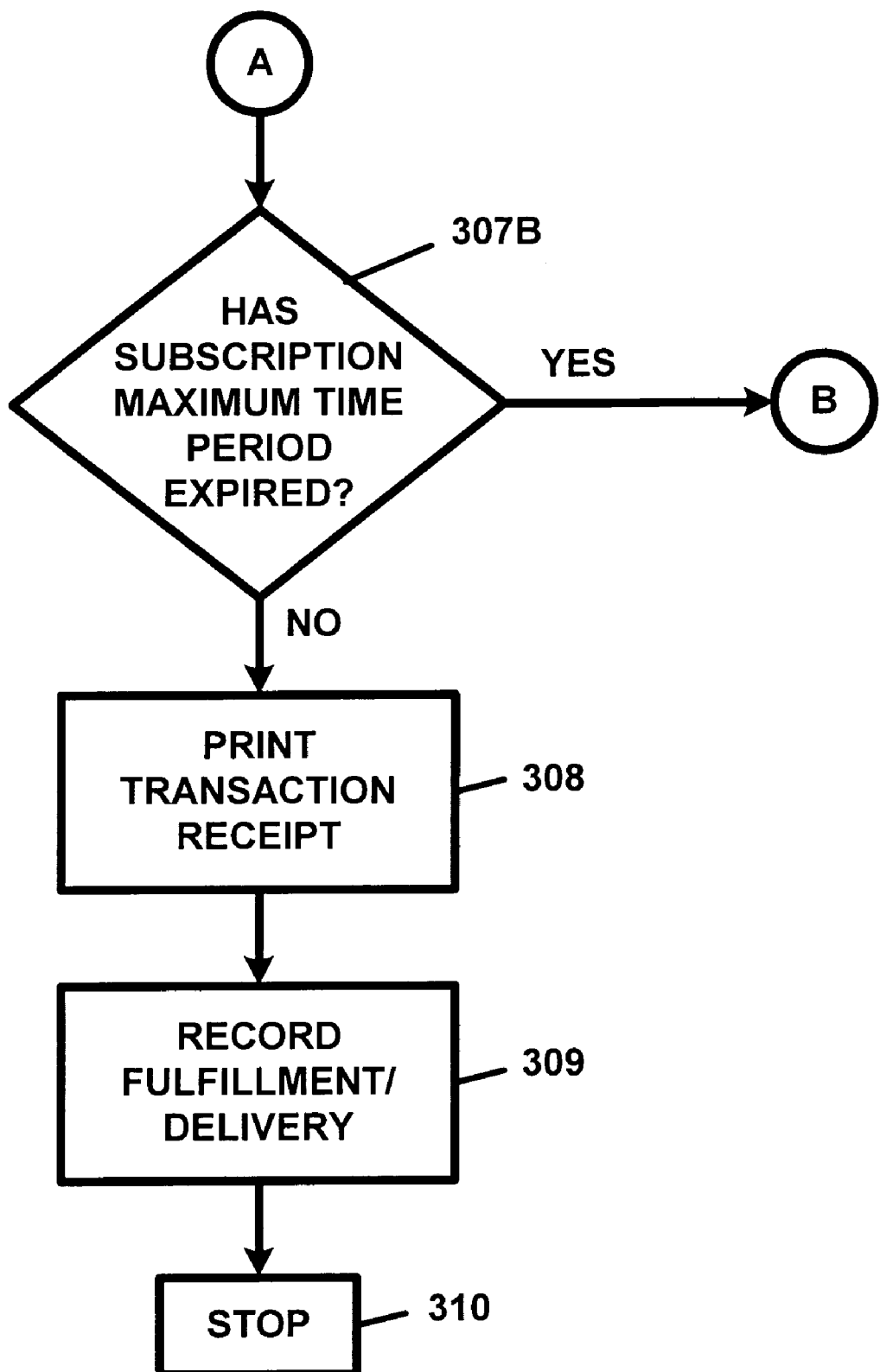

FIGS. 8A and 8B illustrate a flow diagram of another preferred embodiment method for utilizing the apparatus of the present invention wherein the present invention is utilized to fulfill subscriptions and/or to service subscriptions.

In the preferred embodiment of FIGS. 8A and 8B, the apparatus of the present invention allows the individual subscriber to pick-up the issues of the periodicals at a retail facility, such as at a newsstand and/or at a magazine stand, thereby allowing the individual subscriber the freedom and convenience of picking up issues at any desired time and/or from any desired retail facility. Further, in the embodiment of FIGS. 8A and 8B, the present invention allows the individual subscriber to select a subscription term in which to receive or obtain a pre-specified number of issues of the subscription. In this manner, for example, an individual subscriber may skip or miss issues of a subscription and receive or obtain future issues within the same subscription period, without forfeiting the value of the subscription.

The flexible subscription described in conjunction with the preferred embodiment of FIGS. 8A and 8B, can provide an individual subscriber with greater flexibility in receiving subscriptions as well as serve as an incentive to enter into a subscription in the first place. The individual subscriber can also take advantage of subscription discounts (such as discounts from cover price and/or otherwise) while obtaining the desired flexibility in obtaining subscription issues. An individual subscriber can, as a result, obtain and enjoy the full value and/or number of issues when and if he or she can.

It is understood, however, that flexibility can be limited. A subscription provider may set a maximum time period or subscription duration during which time the individual must obtain all of his or her subscription issues or forfeit same. These terms, however, can be agreed upon by the contracting parties.

The operation of the embodiment of FIGS. 8A and 8B commences at step 300. At step 301, the individual subscriber desiring to pick up an issue of his periodical, and/or the salesperson or checkout person at the retail facility, can request the periodical issue by accessing the central subscription fulfillment processing computers 20 via the point-of-sale transaction device 40. Once the central subscription fulfillment processing computers 20 is accessed, subscription account information is entered into the point-of-sale transaction device 40, at step 302, by inputting same via the user input device 40E and/or by swiping a respective account card, smart card, credit card, charge card, debit card, and/or value card, utilized in conjunction with the subscription account, in the scanner/reader 40B.

At step 302, any other information regarding and/or further identifying the subscription account can also be entered and/or input. At step 303, the information entered and/or input at step 302 is transmitted to, and received by, the central subscription fulfillment processing computer 20. At step 304, the central subscription fulfillment processing computer 20 will process the information and determine whether the subscription account is still active. If, at step 304, it is determined that the subscription account is not active, the central subscription processing computer 20 will, at step 305, transmit a signal to the point-of-sale transaction device 40, to provide notification of the inactive or lapsed account.

Thereafter, operation of the present invention will cease at step 306 and the individual subscriber may thereafter, access the central subscription processing computer 10 in order to re-open and/or renew the subscription. In another preferred embodiment, the central subscription fulfillment processing computer 20 can transfer operation to the central subscription processing computer 10, at step 305. Thereafter, subscription account re-opening and/or renewal can occur on-line via the point-of-sale transaction device 40 and operation can proceed to step 302 to re-enter the pertinent account information. This preferred embodiment operation can facilitate a re-opening or renewal of the subscription account in one and the same interaction between the individual subscriber and the salesperson or check-out person at the retail facility.

If, at step 304, it is determined that the subscription account is still active, operation will proceed to step 307A and the central subscription fulfillment processing computer 20 will determine if any issues remain to be fulfilled on the subscription account. If, at step 307A, it is determined that no issues remain to be fulfilled, then operation will proceed to step 305 described above and notification of this fact will be provided to the individual subscriber and/or the salesperson and/or checkout person via the point-of-sale transaction device 40.

Thereafter, operation of the apparatus will proceed as described above with operation either ceasing and/or the individual subscriber renewing the subscription, extending the term of the subscription, and/or purchasing additional issues and/or arranging for same.

If, at step 307A, it is determined that issues remain to be fulfilled on the subscription account, then operation will proceed to step 307B and the central subscription fulfillment processing computer 20 will determine if the maximum time period or duration of the subscription has expired or lapsed. If, at step 307B, it is determined that the time period or duration of the subscription has expired or lapsed, then operation will proceed to step 305 described above and notification of this fact will be provided to the individual subscriber and/or the salesperson and/or checkout person via the point-of-sale transaction device 40. Thereafter, operation of the apparatus will proceed as described above with operation either ceasing and/or the individual subscriber renewing the subscription, extending the term of the subscription, and/or purchasing additional issues and/or arranging for same.

If, at step 307B, it is determined that the time period or duration for the subscription has not expired, then operation will proceed to step 308 and the central subscription fulfillment processing computer 20 will transmit a signal to the point-of-sale transaction device 40 authorizing the pick-up of the issue by the individual subscriber. In the preferred embodiment, at step 308, the point-of-sale device 40, will generate and print a receipt of the transaction, via the printer or output device 40I, for the retail facility for the facility's records. In the preferred embodiment, at step 308, the point-of-sale device 40, will also generate and print a receipt of the transaction, via the printer or output device 40I, for the individual subscriber for the individual subscriber's records.

At step 309, the central subscription fulfillment processing computer 20 will record the fulfillment of the issue delivery and/or transaction, decrease by one the number of issues remaining to be fulfilled on the subscription account, and provide all record updating for the subscription account.

The central subscription fulfillment processing computer 20, in the preferred embodiment, at step 309, will also update any and/or pertinent subscription account records and/or information, for the subscription account, in its database 20H as well as the corresponding records and/or information for the subscription account which are stored in the database 10H of the central subscription processing computer 10.

The above-described updates to the central subscription processing computer database 10H can be performed via transmitting an appropriate signal to the central subscription processing computer 10 and/or via dynamically linked database methods and/or techniques, and/or via nay other device, method and/or techniques known by those skilled in the art.

Thereafter, operation of the apparatus will cease at step 310.

Alternatively, in any and/or all of the embodiments described herein, the subscription(s) may be initiated via a conventional mailing of subscription order form, and/or a "blow-in card" and/or a "bind-in card" typically found in periodicals.

In any and/or all of the embodiments described herein, the central subscription processing computer 10 and/or the central subscription fulfillment processing computer 20 can provide processing for any number and/or type of subscriptions. In this manner, the central subscription processing computer 10 and/or the central subscription fulfillment processing computer 20 can administer, manage, service, and/or provide processing, for any number and/or types of subscriptions.

In any and/or all of the embodiments described herein, the apparatus and method of the present invention can provide for subscriptions which can be initiated and/or created via any communication device 30 and/or any point-of-sale transaction device 40. In any and/or all of the embodiments described herein, the subscriptions can be fulfilled and/or serviced by any retail and/or other facility. In this manner, for example, an individual subscriber may initiate a subscription for a periodical from any location and pick up the issues of the subscription from any retail facility, newsstand and/or store which is a participating facility and/or a facility which utilizes the present invention and/or which utilizes an appropriate point-of-sale transaction device 40, thereby providing flexibility in the issue pick-up location.

In any and/or all of the embodiments described herein, the individual subscriber or an agent and/or other third party intermediary, can access the central subscription processing computer 10 and/or the central subscription fulfillment processing computer 20, via the communication device 30 and/or via the point-of-sale transaction device 40 so as to ascertain the status of a subscription such as, but not limited to, whether the subscription is active or inactive, and/or the fulfillment status of the subscription, such as, but not limited to, the number of issues remaining, time for next renewal, etc.

In any and/or all of the embodiments described herein, the central subscription processing computer 10 and/or the central subscription fulfillment processing computer 20 can also notify individual subscribers, via any means, method and/or manner of communication, via the communication device 30 and/or the point-of-sale transaction device 40, of available subscriptions, of subscription sales and/or specials, of available new issues, renewal notices, extension notices, termination notices, subscription creation and/or initiation notices, shipment to and/or arrival of the subscription issue, goods and/or services at a respective retail facility and/or other facility, and/or of any other information which may be of interest to an individual subscriber.

In any and/or all of the embodiments described herein, the apparatus and method of the present invention can be utilized as a subscription clearinghouse, to match individual subscribers to subscriptions, wherein information regarding any number of, and types of, subscriptions can be stored in the database 10H of the central subscription processing computer 10 and/or the database 20H of the central subscription fulfillment processing computer 20. Any individual subscriber can access the respective central subscription processing computer 10 and/or central subscription fulfillment processing computer 20 and search for a desired subscription or subscriptions. The individual subscriber may then apply for, and/or purchase a subscription.

In any and/or all of the embodiments described herein, an individual subscriber can list an order for a subscription and/or subscriptions, with information regarding the order being stored in the database 10 of the central subscription processing computer 10 and/or the database 20H of the central subscription fulfillment processing computer 20. The central subscription processing computer 10 and/or the central subscription fulfillment processing computer 20 can thereafter process the order or order and notify the individual via the communication device 30 and/or the point-of-sale transaction device 40 if and when the ordered subscription is available. The individual subscriber may be notified via e-mail, electronic transmission, pager message, beeper message, telephone call, telephone message, letter, voice message, physical mail delivery, and/or via any other appropriate means, method and/or technique.

In any and/or all of the embodiments described herein, any of the central subscription processing computer(s) 10, the central subscription fulfillment processing computer(s) 20, the communication device(s) 30, and/or the point-of-sale transaction device(s), can be programmed for automatic operation, self-activation, and/or programmed operation. The central subscription processing computer 10 and/or the central subscription fulfillment processing computer 20 can be programmed to automatically generate and/or to transmit messages and/or notices to any of the individual subscribers, retailers, goods and/or services providers, etc., regarding subscriptions, subscription fulfillment, the availability of subscriptions, availability of issues and/or goods and/or services which are the subject of a subscription.

In any and/or all of the embodiments described herein, intelligent agents, software agents, and/or mobile agents, can be utilized so as to act on behalf of any of the parties and/or any of the respective computers and/or devices described herein. Applicant hereby incorporates by reference herein the subject matter of the *Agent Sourcebook, A Complete Guide to Desktop, Internet and Intranet Agents*, by Alper Caglayan and Colin Harrison, Wiley Computer Publishing, 1997. Applicant also incorporates by reference herein the subject matter of *Cool Intelligent Agents For The Net*, by Leslie L. Lesnick with Ralph E. Moore, IDG Books Worldwide, Inc. 1997.

The present invention provides an apparatus and method for providing subscription and/or subscription fulfillment services, and/or subscription related services. Individual subscribers can obtain subscriptions at discounts off the cover or list prices while being able to maintain control over their ability to receive the issues, goods and/or services, which are the subject of the subscription.

The present invention provides an apparatus and a method wherein all parties benefit. Individuals can obtain subscriptions at cheaper subscription rates and obtain the issues, goods and/or services, which are the subject subscription, where and when desired. Retailers, subscription fulfillment entities, and/or entities can enjoy the benefits of increased business and/or repeated business from individual subscribers. Subscription providers can enjoy the benefits of having increased subscriptions and/or subscription rates.

While the present invention has been described and illustrated in various preferred and alternate embodiments, such descriptions are merely illustrative of the present invention and are not to be construed to be limitations thereof. In this regard, the present invention encompasses all modifications, variations and/or alternate embodiments, with the scope of the present invention being limited only by the claims which follow.

What is claimed is:

1. A computer-implemented method, comprising:
    receiving a request to receive or pick-up, at a retail facility or a store pursuant to a subscription, a printed issue of at least one of a periodical, a newspaper, and a magazine;
    processing information regarding the request with a processing device, wherein the processing device determines whether the subscription is active or not active or determines whether any issue or any issues of the at least one of a periodical, a newspaper, and a magazine, remain to be fulfilled pursuant to the subscription; and
    transmitting a message in response to the request, wherein the message contains an authorization or a denial of the request, and further wherein the message is transmitted to a point-of-sale transaction device located at the retail facility or the store.

2. The computer-implemented method of claim 1, wherein at least one of the request and the message is transmitted on or over at least one of the Internet and the World Wide Web.

3. The computer-implemented method of claim 1, further comprising:
    processing information for at least one of renewing the subscription, extending the subscription, and canceling or terminating the subscription.

4. The computer-implemented method of claim 1, further comprising:
    processing information for creating or initiating the subscription.

5. The computer-implemented method of claim 1, wherein the subscription is for a specified number of the printed issues and is for a specified time period, and further wherein one or more of the printed issues can be skipped or foregone in or during the specified time period while allowing a subscriber to be able to pick-up or receive all of the specified number of the printed issues in or during the specified time period.

6. The computer-implemented method of claim 1, wherein the request contains at least one of an access code, a personal identification number or code, and information obtained from a magnetic strip of an account card or from a microprocessor of an account card.

7. The computer-implemented method of claim 1, further comprising:
    swiping an account card using a scanner device or a reader device to obtain information stored on the account card.

8. The computer-implemented method of claim 1, further comprising:
    processing information regarding a search for the subscription or a search for a second subscription.

9. The computer-implemented method of claim 1, further comprising:
    determining that the subscription is not active; and processing information for re-opening or renewing the subscription.

10. The computer-implemented method of claim 1, further comprising:

generating a second message, wherein the second message contains information regarding at least one of an availability of a subscription and a subscription sale or special; and transmitting the second message to the point-of-sale transaction device or to a communication device associated with an individual or a subscriber, wherein if the second message is transmitted to the communication device the second message is transmitted to the communication device at least one of on or over at least one of the Internet and the World Wide Web and on or over a wireless communication network.

11. The computer-implemented method of claim 1, further comprising:

generating a second message, wherein the second message contains information regarding at least one of an availability of a subscription issue, a shipment of a subscription issue to the retail facility or the store, and an arrival of a subscription issue at the retail facility or the store; and transmitting the second message to the point-of-sale transaction device or to a communication device associated with an individual or a subscriber.

12. The computer-implemented method of claim 11, wherein the second message is transmitted at least one of on or over at least one of the Internet and the World Wide Web and on or over a wireless communication network.

13. The computer-implemented method of claim 1, further comprising:

receiving a second request to receive or pick-up a good or a service at the retail facility or the store pursuant to a second subscription;

processing information regarding the second request;

determining whether the second subscription is active or not active or determining whether any good or service or any goods or services remain to be fulfilled pursuant to the second subscription; and transmitting a second message in response to the second request, wherein the second message contains information regarding an authorization or a denial of the second request, and further wherein the second message is transmitted to the first point-of-sale transaction device or to a second point-of-sale transaction device located at the retail facility or the store.

14. The computer-implemented method of claim 1, further comprising:

receiving a second request to receive or pick-up a ticket or tickets at the retail facility or the store pursuant to a second subscription;

processing information regarding the second request;

determining whether the second subscription is active or not active or determining whether any ticket or any tickets remain to be fulfilled pursuant to the second subscription; and transmitting a second message in response to the second request, wherein the second message contains information regarding an authorization or a denial of the second request, and further wherein the second message is transmitted to the first point-of-sale transaction device or to a second point-of-sale transaction device located at the retail facility or the store.

15. The computer-implemented method of claim 14, wherein the second subscription is a subscription for a ticket or tickets to or for a sporting event or sporting events.

16. The computer-implemented method of claim 14, wherein the second subscription is a subscription for a ticket or tickets to or for at least one of an entertainment event, entertainment events, a movie, movies, a show, shows, a theater performance, and theater performances.

17. The computer-implemented method of claim 1, further comprising:

processing information regarding a changing of the retail facility or the store from which a printed issue of the at least one of a periodical, a newspaper, and a magazine, can be received or picked-up.

18. A computer-implemented method, comprising:

processing a request to create or initiate a subscription which allows for printed issues of at least one of a periodical, a newspaper, and a magazine, to be picked-up at a retail facility or a store or to be received at a retail facility or a store or at another retail facility or another store, wherein the request is transmitted from a communication device or from a transaction device associated with the retail facility or the store, wherein the request contains information regarding a specified number of printed issues of the at least one of a periodical, a newspaper, and a magazine, to be picked-up or received at the retail facility or the store or at another retail facility or another store in or during a specified time period, wherein one or more of the printed issues can be skipped or foregone in or during the specified time period while ensuring that a subscriber is able to pick-up or receive all of the specified number of the printed issues at the retail facility or the store or at another retail facility or another store in or during the specified time period, wherein the request is processed with a processing device; creating or initiating a subscription in response to the request; and transmitting a message to the communication device or to the transaction device associated with the retail facility or the store, wherein the message contains information regarding the subscription which was created or initiated.

19. The computer-implemented method of claim 18, wherein at least one of the request and the message is transmitted on or over at least one of the Internet and the World Wide Web.

20. The computer-implemented method of claim 18, further comprising:

processing information for at least one of renewing the subscription, extending the subscription, and canceling or terminating the subscription.

21. The computer-implemented method of claim 18, further comprising:

processing information regarding a search for the subscription or a search for a second subscription.

22. The computer-implemented method of claim 18, further comprising:

generating a second message, wherein the second message contains information regarding at least one of an availability of a subscription, an availability of a subscription issue, a shipment of a subscription issue to the retail facility or the store or to another retail facility or another store, and an arrival of a subscription issue at the retail facility or the store or at another retail facility or another store; and transmitting the second message to the point-of-sale transaction device or to a communication device associated with an individual or the subscriber.

23. The computer-implemented method of claim 22, wherein the second message is transmitted at least one of on or over at least one of the Internet and the World Wide Web and on or over a wireless communication network.

24. The computer-implemented method of claim 18, further comprising:
processing a second request, wherein the second request is a request to create or initiate a second subscription, wherein the second subscription allows for at least one of a good, goods, a service, and services, to be picked-up or received at the retail facility or the store or at another retail facility or another store, wherein the second request is transmitted from the communication device or from the transaction device, or the second request is transmitted from a second communication device or from a second transaction device associated with the retail facility or the store or associated with another retail facility or another store;
creating or initiating a second subscription in response to the second request; and
transmitting a second message to the communication device or to the transaction device, or transmitting the second message to the second communication device or to the second transaction device, wherein the second message contains information regarding the second subscription which was created or initiated.

25. The computer-implemented method of claim 18, further comprising:
processing a second request, wherein the second request is a request to create or initiate a second subscription, wherein the second subscription allows for a ticket or tickets to be picked-up or received at the retail facility or the store or at another retail facility or another store, wherein the second request is transmitted from the communication device or from the transaction device, or the second request is transmitted from a second communication device or from a second transaction device associated with the retail facility or the store or associated with another retail facility or another store;
creating or initiating a second subscription in response to the second request; and
transmitting a second message to the communication device or to the transaction device, or transmitting the second message to the second communication device or to the second transaction device, wherein the second message contains information regarding the second subscription which was created or initiated.

26. The computer-implemented method of claim 25, wherein the second subscription is a subscription for a ticket or tickets to or for a sporting event or sporting events.

27. The computer-implemented method of claim 25, wherein the second subscription is a subscription for a ticket or tickets to or for at least one of an entertainment event, entertainment events, a movie, movies, a show, shows, a theater performance, and theater performances.

28. The computer-implemented method of claim 18, further comprising:
processing information regarding a second request, wherein the second request is a request to pick-up or receive a printed issue of at least one of a periodical, a newspaper, and a magazine, at a retail facility or a store or at another retail facility or another store pursuant to the subscription;
determining whether the subscription is active or not active or determining whether any issue or any issues of the at least one of a periodical, a newspaper, and a magazine, remain to be fulfilled pursuant to the subscription; and
transmitting a second message in response to the second request, wherein the second message contains an authorization or a denial of the second request, and further wherein the second message is transmitted to the communication device or to the transaction device, or is transmitted to a second communication device or to a second transaction device associated with the retail facility or the store or associated with another retail facility or another store.

29. A computer-implemented method, comprising:
processing a request to create or initiate a subscription which allows for printed issues of at least one of a periodical, a newspaper, and a magazine, to be picked-up at a retail facility or a store, or to be received at a retail facility or a store, wherein the request is transmitted from a communication device or from a transaction device associated with a retail facility or a store, wherein the request contains information regarding a specified number of printed issues of at least one of a periodical, a newspaper, and a magazine, to be picked-up or received in or during a specified time period, and a retail facility or a store from which the printed issues can be picked-up or received, wherein the request is processed with a processing device; creating or initiating a subscription in response to the request; and
transmitting a message to the communication device or to the transaction device associated with the retail facility or the store, wherein the message contains information regarding the subscription which was created or initiated.

30. The computer-implemented method of claim 29, wherein one or more of the printed issues can be skipped or foregone in or during the specified time period while allowing a subscriber to be able to pick-up or receive all of the specified number of the printed issues in or during the specified time period.

31. The computer-implemented method of claim 29, wherein at least one of the request and the message is transmitted on or over at least one of the Internet and the World Wide Web.

32. The computer-implemented method of claim 29, further comprising:
processing information for at least one of renewing the subscription, extending the subscription, and canceling or terminating the subscription.

33. The computer-implemented method of claim 29, further comprising:
processing information regarding a search for the subscription or a search for a second subscription.

34. The computer-implemented method of claim 29, further comprising:
generating a second message, wherein the second message contains information regarding at least one of an availability of a subscription, an availability of a subscription issue, a shipment of a subscription issue to the retail facility or the store, and an arrival of a subscription issue at the retail facility or the store; and
transmitting the second message to the point-of-sale transaction device or to a communication device associated with an individual or a subscriber.

35. The computer-implemented method of claim 34, wherein the second message is transmitted at least one of on or over at least one of the Internet and the World Wide Web and on or over a wireless communication network.

36. The computer-implemented method of claim 29, further comprising:
processing a second request, wherein the second request is a request to create or initiate a second subscription, wherein the second subscription allows for at least one of a good, goods, a service, and services, to be picked-up or received at the retail facility or the store, wherein the second request is transmitted from the communication device or from the transaction device, or is transmitted from a second communication device or from a second transaction device associated with the retail facility or the store;
creating or initiating a second subscription in response to the second request; and
transmitting a second message to the communication device or to the transaction device, or transmitting the second message to the second communication device or to the second transaction device, wherein the second message contains information regarding the second subscription which was created or initiated.

37. The computer-implemented method of claim 29, further comprising:
processing a second request, wherein the second request is a request to create or initiate a second subscription, wherein the second subscription allows for a ticket or tickets to be picked-up or received at the retail facility or the store, wherein the second request is transmitted from the communication device or from the transaction device, or is transmitted from a second communication device or from a second transaction device associated with the retail facility or the store;
creating or initiating a second subscription in response to the second request; and
transmitting a second message to the communication device or to the transaction device, or transmitting the second message to the second communication device or to the second transaction device, wherein the second message contains information regarding the second subscription which was created or initiated.

38. The computer-implemented method of claim 37, wherein the second subscription is a subscription for a ticket or tickets to or for a sporting event or sporting events.

39. The computer-implemented method of claim 37, wherein the second subscription is a subscription for a ticket or tickets to or for at least one of an entertainment event, entertainment events, a movie, movies, a show, shows, a theater performance, and theater performances.

40. The computer-implemented method of claim 29, further comprising:
processing information regarding a second request, wherein the second request is a request to pick-up or receive a printed issue of at least one of a periodical, a newspaper, and a magazine, at the retail facility or the store pursuant to the subscription;
determining whether the subscription is active or not active or determining whether any issue or any issues of the at least one of a periodical, a newspaper, and a magazine, remain to be fulfilled pursuant to the subscription; and
transmitting a second message in response to the second request, wherein the second message contains an authorization or a denial of the second request, and further wherein the second message is transmitted to the communication device or to the transaction device, or is transmitted to a second communication device or to a second transaction device associated with the retail facility or the store.

41. A computer-implemented method, comprising:
inputting or entering information regarding a request to receive or pick-up, at a retail facility or a store pursuant to a subscription, a printed issue of at least one of a periodical, a newspaper, and a magazine, wherein the subscription is an existing subscription, and further wherein the information is input or entered into a point-of-sale transaction device located at the retail facility or the store; generating a request to receive or pick-up a printed issue of at least one of a periodical, a newspaper, and a magazine, at the retail facility or the store pursuant to the subscription; transmitting the request to a processing device; receiving the request, wherein the processing device receives the request; processing the information regarding the request with the processing device, wherein the processing device determines whether the subscription is active or not active or determines whether any issue or any issues of the at least one of a periodical, a newspaper, and a magazine, remain to be fulfilled pursuant to the subscription; transmitting a message in response to the request, wherein the message contains an authorization or a denial of the request, and further wherein the message is transmitted to the point-of-sale transaction device; and providing information contained in the response via the point-of-sale transaction device.

42. A computer-implemented method, comprising:
receiving a first request to receive or pick-up, at a retail facility or a store pursuant to a subscription, a printed issue of at least one of a periodical, a newspaper, and a magazine; processing information regarding the first request with a processing device, wherein the processing device determines whether the first subscription is active or not active or determines whether any issue or any issues of the at least one of a periodical, a newspaper, and a magazine, remain to be fulfilled pursuant to the first subscription; transmitting a first message in response to the first request, wherein the first message contains an authorization or a denial of the first request, and further wherein the first message is transmitted to a first point-of-sale transaction device located at the retail facility or the store; receiving a second request to receive or pick-up a ticket or tickets to at least one of a sporting event, an entertainment event, a movie, a show, and a theater performance, at the retail facility or the store pursuant to a second subscription; processing information regarding the second request; determining whether the second subscription is active or not active or determining whether any ticket or any tickets remain to be fulfilled pursuant to the second subscription; and transmitting a second message in response to the second request, wherein the second message contains information regarding an authorization or a denial of the second request, and further wherein the second message is transmitted to the first point-of-sale transaction device or to a second point-of-sale transaction device located at the retail facility or the store.

43. A computer-implemented method, comprising:
receiving a first request to receive or pick-up, at a retail facility or a store pursuant to a subscription, a printed issue of at least one of a periodical, a newspaper, and a magazine; processing information regarding the first request with a processing device, wherein the processing device determines whether the first subscription is active or not active or determines whether any issue or any issues of the at least one of a periodical, a newspaper, and a magazine, remain to be fulfilled pursuant to the first subscription; transmitting a first message in response to the first request, wherein the first message contains an authorization or a denial of the first request, and further wherein the first message is transmitted to a first point-of-sale transaction device located at the retail facility or the store; receiving a second request to receive or pick-up at least one of a good or a service at the retail facility or the store pursuant to a second subscription; processing information regarding the second request; determining whether the second subscription is active or not active or determining whether any good or service or any goods or services remain to be fulfilled pursuant to the second subscription; and transmitting a second message in response to the second request, wherein the second message contains information regarding an authorization or a denial of the second request, and further wherein the second message is transmitted to the first point-of-sale transaction device or to a second point-of-sale transaction device located at the retail facility or the store.

44. A computer-implemented method, comprising:

processing a request to create or initiate a subscription which allows for printed issues of at least one of a periodical, a newspaper, and a magazine, to be picked-up at a retail facility or a store or to be received at a retail facility or a store or at another retail facility or another store, wherein the request is transmitted from a communication device or from a transaction device associated with the retail facility or the store, wherein the request contains information regarding a specified number of printed issues of the at least one of a periodical, a newspaper, and a magazine, to be picked-up or received at the retail facility or the store or at another retail facility or another store in or during a specified time period, wherein one or more of the printed issues can be skipped or foregone in or during the specified time period while ensuring that a subscriber is able to pick-up or receive all of the specified number of the printed issues at the retail facility or the store or at another retail facility or another store in or during the specified time period, wherein the request is processed with a processing device;

creating or initiating a subscription in response to the request; and transmitting a message to the communication device or to the transaction device associated with the retail facility or the store, wherein the message contains information regarding the subscription which was created or initiated and an authorization to allow for a first printed issue of the at least one of a periodical, a newspaper, and a magazine, to be picked-up or received at the retail facility or the store pursuant to the subscription which was created or initiated.

45. A computer-implemented method, comprising:

processing a request to create or initiate a subscription which allows for printed issues of at least one of a periodical, a newspaper, and a magazine, to be picked-up at a retail facility or a store or to be received at a retail facility or a store, wherein the request is transmitted from a communication device or from a transaction device associated with a retail facility or a store, wherein the request contains information regarding a specified number of printed issues of at least one of a periodical, a newspaper, and a magazine, to be picked-up or received in or during a specified time period, and a retail facility or a store from which the printed issues can be picked-up or received, wherein the request is processed with a processing device;

creating or initiating a subscription in response to the request; and transmitting a message to the communication device or to the transaction device associated with the retail facility or the store, wherein the message contains information regarding the subscription which was created or initiated and an authorization to allow for a first printed issue of the at least one of a periodical, a newspaper, and a magazine, to be picked-up or received at the retail facility or the store pursuant to the subscription which was created or initiated.

* * * * *